US005706510A

United States Patent [19]
Burgoon

[11] Patent Number: 5,706,510
[45] Date of Patent: Jan. 6, 1998

[54] ZYMBOLIC HISTORY MANAGEMENT SYSTEM

[75] Inventor: David A. Burgoon, Fort Collins, Colo.

[73] Assignee: Hewlett-Packard Company, Palo Alto, Calif.

[21] Appl. No.: 617,989

[22] Filed: Mar. 15, 1996

[51] Int. Cl.$^6$ .................................................. G06F 17/30
[52] U.S. Cl. ............................................. 395/619; 395/712
[58] Field of Search ........................... 395/619, 701–703, 395/712, 601, 608, 617, 772

[56] References Cited

U.S. PATENT DOCUMENTS

| | | | |
|---|---|---|---|
| 4,809,170 | 2/1989 | Leblang et al. | 395/703 |
| 4,912,637 | 3/1990 | Sheedy et al. | 395/619 |
| 5,295,222 | 3/1994 | Wadhwa et al. | 395/703 |
| 5,313,646 | 5/1994 | Hendricks et al. | 395/612 |
| 5,355,476 | 10/1994 | Fukumura | 395/601 |
| 5,386,559 | 1/1995 | Eisenberg et al. | 395/617 |
| 5,493,682 | 2/1996 | Tyra et al. | 395/703 |
| 5,551,028 | 8/1996 | Voll et al. | 395/614 |
| 5,574,898 | 11/1996 | Leblang et al. | 395/601 |
| 5,581,755 | 12/1996 | Koerber et al. | 395/614 |

OTHER PUBLICATIONS

Walter F. Tichy, "RCS—A System for Version Control," *Software–Practice and Experience*, vol. 15, No. 7, Jul. 1985, pp. 637–654.

Scott A. Kramer, History Management System, 1991, pp. 1–4; Proceedings of 3rd Int'l Workshop on Software Configuration Management.

Marc J. Rochkind, The Source Code Control System, Dec. 1975, pp. 364–370, IEEE Transactions on Software Engineering.

Walter F. Tichy, Design, Implementation, and Evaluation of a Revision Control System, 1982, pp. 58–67, © IEEE.

Selection of Reprinted Standard UNIX Commands, 21 pages, HP-UX Release 9.0, Aug. 1992.

*Primary Examiner*—Paul V. Kulik

[57] ABSTRACT

A zymbolic history management system (ZHMS) allows a user to create annotated symbolic links (zymlinks) to files in a shared file system. A single link is created to each file of the shared file system which a user wishes to access. A zymlink to the shared file system may be updated via a zupdate command. Rather than selectively updateing individual files, a user simply zupdate's whole trees of files. When it comes time to edit files, a user makes use of standard history managed file system commands to obtain a writable copy of a file. Use of one of these commands destroys a zymlink corresponding to the file, and substitutes a privately owned copy of the file on a user's disk. When the edited file is checked back into the history managed file system, a read-only copy of the file remains on a user's disk. When a user updates his or her file system, the read-only file copy may be replaced with a new zymlink. A user will normally view current versions of shared files. Rather than viewing current versions of shared files, a user may wish to maintain a static view of file versions by issuing a zreset command. The system provides a user with more free disk space than in conventional history managed systems.

20 Claims, 7 Drawing Sheets

ZYMBOLIC HISTORY MANAGEMENT SYSTEM

BACKGROUND OF THE INVENTION

This invention pertains to the viewing and accessing of history managed computer files, and more particularly, to a method and apparatus for allowing a user to 1) view logically private, but physically shared, history managed files, 2) obtain a user-owned physical copy of a history managed file when that file no longer exists within the realm of physically shared history managed files, and 3) simply manage his or her views of history managed files. The method and apparatus which is used to accomplish the above tasks is herein referred to as a Zymbolic History Management System (ZHMS).

ZHMS is an improvement to history managed file systems. In general, a history managed file system is a system used to maintain a set of archives representing the complete history of a set of design files. Revisions to a file are saved as "deltas" in a single file revision archive. Tools used to access the file revision archives insure the mutually exclusive creation of file versions (i.e., revisions). A log of revision information is stored in each file revision archive. The log may comprise author, revision number, date and time of modification, and commentary information.

A first generally accepted method of storing and managing file revisions was the Source Code Control System (SCCS). SCCS was developed as an aid in managing source code revisions and is described in detail in "The Source Code Control System" by Rochkind, *IEEE Transactions on Software Engineering*, Vol. SE-1, No. 4, pp. 364–370 (Dec. 1975), which is hereby incorporated by reference for all that it discloses.

An improvement over SCCS was the Revision Control System (RCS). RCS is described in detail in "Design, Implementation, and Evaluation of a Revision Control System" by Tichy, *Proceedings of the IEEE 6th International Conference on Software Engineering*, pp. 58–67, (Sep. 1982), which is hereby incorporated by reference for all that it discloses. The primary difference between RCS and SCCS is in the way deltas are stored and managed.

As design projects grew larger, and design engineers from across the country began to work on joint development projects, a method was needed for allowing programmers common access to a body of file revision archives, while at the same time providing each designer with private workspace in which he or she could work on new developments to a design project. A history managed file system which filled this need was HMS.

HMS is a client/server based system used to manage versioned files. A server is installed on a central computer and manages an HMS database of file revision archives. Numerous other computers, possibly of varying types (HMS supports multiple platforms) exist as clients of the server. HMS provides a hierarchical view of the files it manages. A commercial version of HMS has recently been released by Hewlett-Packard Company as "SoftBench CM". In summary, a history managed file system such as HMS comprises the following features:

1) transparent access to files distributed across a computer network,
2) maintenance of historical changes to a file, thereby allowing previous versions of a file to be accessed,
3) file check-in and check-out procedures (and means for a user to "lock" a file while making changes),
4) file references which are independent of storage location, and
5) the ability to access SCCS, RCS, binary and other versioned file types.

One of HMS's most important features is that a user's workspace is separate and hidden from the space which is used to maintain and manage file revision archives. A user's workspace is also separate from the workspace of any other user. Unfortunately, this feature is also one of the drawbacks of HMS. Since HMS requires a user to obtain a copy of each HMS file version he or she wishes to use, the amount of file storage space available to hold these "working" files can often be exceeded. As a result, a user may spend a significant amount of time managing their file storage space (i.e., deleting files to make room for additional files, and then re-retrieving the deleted files when they are once again needed). Hands-on management of file storage space reduces productivity, and fails to produce tangible progress. This is unfortunate, since a user typically modifies only a small fraction of the total number of files in his or her workspace, but requires read-only access to a much larger number of files.

It is therefore a primary object of this invention to provide a system of file history management wherein a user's file storage space remains logically private, but has access to a number of physically shared files.

It is a further object of this invention to provide a system of file history management wherein the shared files may be periodically updated.

It is yet another object of this invention to provide a system of file history management wherein a designer may undo a periodic update to the shared file system with respect to his or her logically separate view of the shared files.

It is an additional object of this invention to provide a system of file history management wherein a designer has the freedom to choose whether he or she reads shared files, or personally owned "physical" files.

SUMMARY OF THE INVENTION

In the achievement of the foregoing objects, the inventor has devised an improvement to a history managed file system. The improvement is stored in one or more computer accessible storage medias. The improvement (hereafter merely referred to as a "system" or "ZHMS") allows a user to access a plurality of files, and more particularly, specific versions of the plurality of files. ZHMS comprises a shared file system, and a plurality of user file systems, all of said file systems being physically stored within the one or more computer readable storage medias as logically separate file systems.

The shared file system employs read-only access to a number of file revision archives stored in a history managed file system which is logically separate from the shared and plurality of user file systems. The shared file system comprises a plurality of file versions, organized in directory hierarchies and derived from the file revision archives. It also comprises first revision information files derived from the file revision archives. Each first revision information file comprises file revision information corresponding to the file versions of one or more of the shared file system's directory hierarchies.

The plurality of user file systems have read-only access to the shared plurality of file versions, and read/write access to the file revision archives.

Map entries indicate which directory hierarchies comprising any of the plurality of user file systems correspond with the directory hierarchies of the shared file system.

A plurality of symbolic links are stored as files in the directory hierarchies comprising any of the plurality of user file systems. Each of the symbolic links corresponds to a file version comprising the shared file system. The correspondence of symbolic links and shared file versions is based on the map entries.

Finally, the system comprises second revision information files which are initially derived from the first revision information files. Each second revision information file comprises file revision information corresponding to the symbolic links of one or more of a user file system's directory hierarchies.

ZHMS offers important advantages over systems merely using HMS or other history managed file systems. Foremost, with ZHMS each user is not required to maintain separate copies of file versions in his or her own file system. The user merely stores links to a number of shared files. This allows a user to "free up" vast amounts of file storage space.

A user's links to the shared files are annotated symbolic links (referred to herein as "zymlinks"). The annotations are stored as part of a user's file system (second revision information files), but to a degree, reflect file revision information which is stored in the shared file system (first revision information files). Although comprising similar information, the revision information files are separately managed and maintained. The revision information files help assist a user in retaining a static view of files. For example, if the file versions of the shared file system are updated, a user may issue a command which uses the revision information files to retrieve older file versions directly from the history managed file system.

ZHMS alleviates a user's micro-management of files and directories by allowing him or her read-only access to whole trees of files (many more files than a user could access under HMS) without significantly impacting utilization of file storage space (i.e., disk space), or without requiring the physical sharing of a user's own directories.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawing in which.

DESCRIPTION OF THE PREFERRED EMBODIMENT

1. Overview of ZHMS

Figure 1:
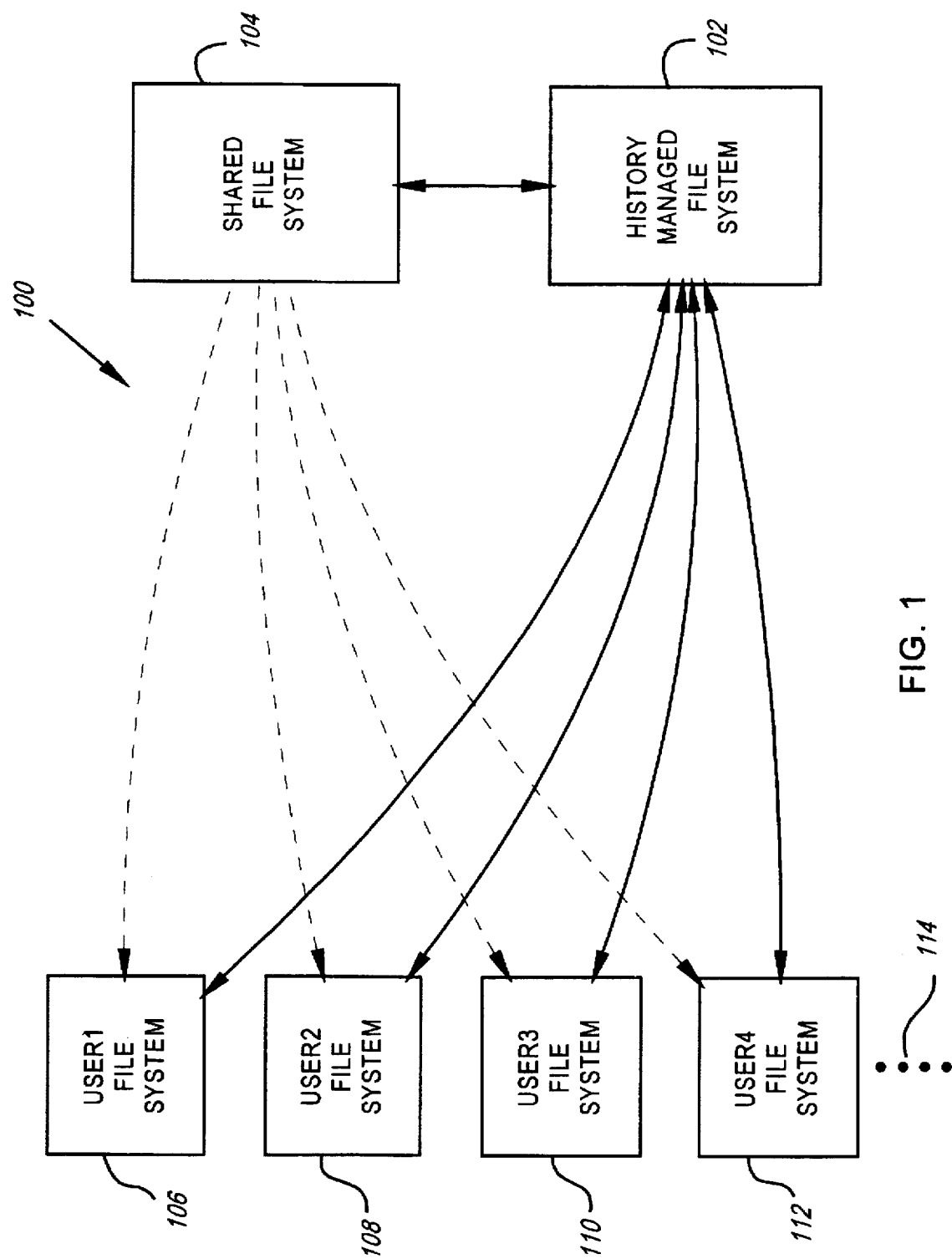
FIG. 1 is a schematic illustrating the components of a ZHMS system, and the flow of data between these components.
Figure 2:
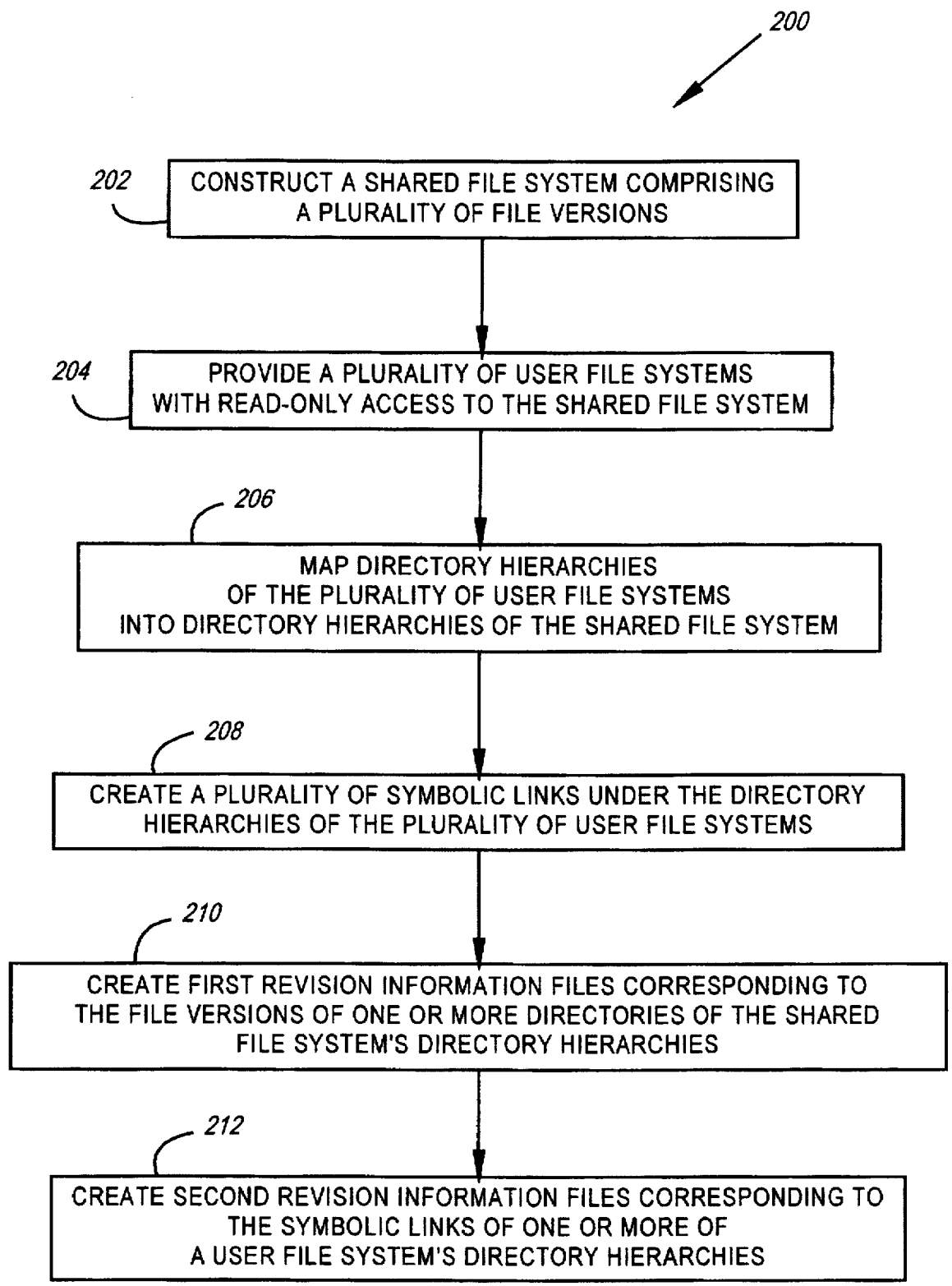
FIG. 2 is a flow chart outlining the basic tasks performed by ZHMS.

The basic tasks 200 which might be performed by software implementing ZHMS (a zymbolic history management system) are outlined in the flow chart of FIG. 2. Note that all of the tasks 200 must be performed, but that their completion order is not critical. To begin, a shared file system 104 (FIG. 1) comprising a plurality of file versions 302–310 is constructed 202. The file versions 302–310 are constructed 202 from a plurality of file revision archives 312–324 stored in a history managed file system 102. The shared 104 and history managed 102 file systems are logically separated from one another. After the shared file system 104 is constructed 202, a plurality of user file systems 106–114 are provided 204 with read-only access to the shared file system 104. Each of the plurality of user file systems 106–114 is logically separated from the shared file system 104, the history managed file system 102, and each other. The plurality of user file systems 106–114 are understood to have read/write access to the history managed file system 102. Following the above tasks 202, 204, directory hierarchies 344 of the plurality of user file systems 106 are mapped 206 into directory hierarchies 326 of the shared file system 104. [Note: As used in this description, the term "directory hierarchy" is used to refer to a directory, and when they exist, all subdirectories of the directory.] Using these mappings 352, a plurality of files 436–442 is created 208 under the directories of the directory hierarchies 344, 446, 448 (FIGS. 3, 4) of a user file system 106, wherein each of the created files 436–442 is a symbolic link corresponding to a file version 302–308 in the shared file system 104. First revision information files 354, 356 are created 210. The first revision information files 354, 356 are derived from the file revision archives 312–324 of the history managed file system 102. Each first revision information file 354, 356 comprises file revision information corresponding to the file versions 302–308 of one or more of the shared file system's directories 326, 328, 330. Second revision information files 450 (FIG. 4) are also created 212. The second revision information files 450 are initially derived from the first revision information files 354 and comprise file revision information corresponding to the symbolic links 436–442 of one or more of a user file system's directory hierarchies 344, 446, 448. After their initial derivation, the second revision information files 450 are managed and maintained separately from the first revision information files 354, 356.

Apparatus 100 used in implementing ZHMS is pictured in FIG. 1. The apparatus 100 may generally comprise a shared file system 104, and a plurality of user file systems 106–114. All of the file systems 104, 106–114 are physically stored within one or more computer accessible storage medias. However, each of the file systems 104 is logically separate from the other file systems 106–114. The shared file system 104 employs read-only access to a number of file revision archives 312–324 (FIG. 3) stored in a history managed file system 102. The history managed file system 102 is logically separate from both the shared 104 and plurality of user file systems 106–114. The shared file system 104 comprises a plurality of file versions 302–310, the file versions 302–310 being organized in hierarchical directories 326–334. The file versions 302–310 are derived from the file revision archives 312–320. The shared file system 104 also comprises first revision information files 354, 356, each first revision information file 354, 356 also being derived from the file revision archives 312–320. Each of the first revision information files 354 comprises file revision information corresponding to the file versions 302–308 of one or more of the shared file system's directories 326, 328, 330. The plurality of user file systems 106–114 have read-only access to the plurality of file versions 302–310 stored in the shared file system 104. The user file systems 106–114 also have read/write access to the file revision archives 312–324. A map entry 352 is required for indicating a correspondence between the directory hierarchies 344, 446, 448 (FIGS. 3, 4) comprising any of the plurality of user file systems 106 and the directory hierarchies 326, 328, 330 of the shared file system 104. A plurality of symbolic links are stored as files 436–442 in the directories of the directory hierarchies 344, 446, 448 comprising any of the plurality of user file systems 106. Each of the symbolic links 436–442 corresponds to a file version 302–308 comprising the shared file system 104; the correspondence of symbolic links 436–442 and file versions 302–308 being based on a map entry 352. Second revision information files 450 are initially derived from the first revision information files 354. Each of the second revision information files 450 comprises file revision information corresponding to the symbolic links 436–442 of one or more of a user file system's directory hierarchies 344, 446, 448.

ZHMS works in conjunction with a history managed file system 102. See FIG. 1. A detailed description of a history managed file system 102, colloquially entitled "HMS", follows below. While ZHMS could be configured to work with any history managed file system 102 (such as Hewlett-Packard's "SoftBench CM"), the currently preferred embodiment of ZHMS is specifically designed to work with HMS.

2. Overview of HMS

The following commands describe basic features of
A. HMS(1)
NAME
History Management System—manage RCS, SCCS and BINARY files in a network
DESCRIPTION
The History Management System (HMS) is a set of tools which manage both versioned and nonversioned files in a distributed, networked environment. HMS provides several advantages over direct use of SCCS or RCS, including:

(1) transparent access to files distributed across machines,
(2) multi-platform support (HP-UX, Sun, Domain, SCO Xenix, MS-DOS, ... )
(3) file references which are independent of storage location,
(4) added/new functionality for SCCS users, commands independent of the underlying control system,
(6) binary file versioning,
(7) time dependency abilities within make(1),
(8) minimal system maintenance.

The remainder of this description is divided into 6 parts: SHARED SOURCE MODIFICATIONS, BASIC CONCEPTS, SITE INSTALLATION, MACHINE INSTALLATION, USER CONFIGURATION, and CONFIGURATION & LOG FILES.
SHARED SOURCE MODIFICATIONS Some of the material covered in this tutorial is not relevant to shared source:

(1) The HMS server and client programs have been installed on all shared source shadow machines. The master shared source machine, hpfcld, is the only server that will accept source modifications. All other shadow machines will only accept read-only access.
(2) If you wish to access shared source from your own workstation, you will need to install the HMS client programs. Look at the MACHINE INSTALLATION section for more details.

BASIC CONCEPTS

HMS provides a hierarchical view of the files it manages: file paths in HMS have the same syntax as file paths in HP-UX. HMS has its own logical file system, and since this is often confused with the operating system file system, different terms are used in the following discussion. The term project directory is used to refer to HMS directories and the term control file is used when referring to HMS managed files.

HMS is architected in the client-server model. A server is installed on a central machine and manages the HMS database. The clients are installed on all machines, and they interact with the HMS server to perform the HMS operations.
SITE INSTALLATION Site installation involves several steps. Each is described in detail below. Perform them in the following order:

(1) Choose a machine on which to install the HMS server.
(2) Add the hmgr user to /etc/passwd.
(3) Install the HMS server package on the machine just chosen.
(4) Initialize the HMS server tables.
(5) Add the HMS server to /etc/inittab or /etc/rc.

Choosing the HMS Server Machine

The HMS server machine is the machine which contains (or will contain) all the control files. IL must have disk space for all the control files. CPU power and LAN I/O are the primary performance limiters, though total CPU usage is quite small, except in extreme cases. The recommendation is to choose a quick machine with fast LAN, such as a 9000/720 or 9000/425, but most any HP-UX machine will work.
Adding the hmgr User Add a pseudo user, hmgr, to the /etc/passwd file. The HMS server program will always run as the user hmgr, and all files managed by HMS will be owned by this user. Any userid (and groupid) number may be chosen, but it should be a number different than any real user. The second field of the hmgr/etc/passwd entry should be '*'. Example entry:

```
hmgr:*:10000:10000:HMS
id:/usr/history:/bin/sync
```

Install the HMS Server Package

To instab the HMS server package, use the ninstall program. As root, execute the following command:

```
ninstall -h hp-gjd -v hmsd
```

Initialize the HMS Server Tables

The maptab, hms.perm, hms.options and inetd.sec files need to be initialized. See the descriptions for these files in the HMS CONFIGURATION & LOG FILES section below. If a first-time installation, sample versions of these files will be automatically installed. For updates to an existing installation, examine the new files in the /usr/history/newconfig directory and incorporate any changes.
Starting the HMS Daemon The HMS server program, /usr/history/hmsd, is started by executing it as either the user hmgr, or by starting it as the user root. If started as the user root, it will change its real and effective user ids to the user hmgr. Once started successfully, it disassociates itself from the connecting try and places itself into background (although it is well behaved per Dave Lennert's How To Write a UNIX Daemon paper). Initialization errors are printed to standard error. After initialization, all messages are printed to the /usr/history/ histlog file. The server can also be started from inittab via the following line:

```
hm:23456a:once:sh -c "export TZ;
TZ=MST7MDT exec /usr/history/hmsd"
```

Change the TZ value as appropriate for your time zone.

The HMS server has no command line options.

MACHINE INSTALLATION

Machine installation involves one step:

(1) Install the HMS client package.

Install the HMS Client Package

To install the HMS client package, execute the following command as root:

```
ninstall -h hp-gjd -v hms
```

The ninstall will automatically run the customize script. It will modify the /etc/services file to add the service hmgr if it is not already there. Port conflicts, if any, will be printed.

USER CONFIGURATION

HMS provides a convenient method for specifying the project from which to access a file. All commands examine a lookup table for translating the current working directory into a default HMS project path. This feature means that as a user changes his working directory to work on different pieces of code, the current HMS project directory will change at the same time. Any time a full project path is omitted from a file specification, the default project directory is automatically prepended. Of course, if full project paths are always specified to a command, none of this mapping is needed, or used.

In a similar way, the lookup table contains information specifying which HMS daemon to use for each HMS project directory.

Current Working HMS Project Directory

The files /usr/local/lib/fmrc and $HOME/.fmrc, if they exist, define various defaults for the HMS commands. The environment variable $FMRC, if defined, overrides these default files. It consists of a colon separated list of files to read. The fmrc files contain several types of entries described separately below.

The fmrc files can contain entries of the form

```
# mapdir /<directory_path> /<project_path>
mapdir $HOME/work/gjd  /gjd
```

These entries establish a current working directory to HMS project directory correspondence. When the current working directory is either /<directory_path> or contains /<directory_path> as a prefix, then the current working project becomes the corresponding project under /<project_ path>. For example, if the working directory is $HOME/ work/gjd/tools, then the working project, according to the above mapping, is /gjd/tools. Any number of entries may exist in the fmrc file, one per line. Blank lines and lines beginning with '#' are ignored. Environment variables, as in this example, wW also be expanded.

HMS Server Selection

The fmrc files can also contain entries of the form

```
#usehost <host>  < project_path>
usehost hp-gjd.hp.com  /gjd
``` which specify a certain host to use when accessing a given HMS project directory. The example above tells the HMS commands to use the HMS server on hp-gjd.hp.com for all accesses to the project/gjd. The host field may also contain an address in standard dot notation.

HMS Default Revision Selection

Finally, the fmrc files can be used to provide a default file revision string. The following is oriented for use with RCS and BIN versioning typed files. A line in .fmrc of the form

```
#usetags /<directory_path>  <tag-list>
usetags /users/sk/cms
Tag_rev_list,defaultRev
``` specifies the default revision to use when accessing a file.

On checkout, the first item in the comma separated list which is either a revision string, or a defined symbolic name (tag) is used to determine the actual revision to get. If none of the items in the list resolve a revision, then the access fails.

On checkin, if the first item is not defined, then a new branch is created and the first item is defined to reference the newly created branch. In this way, checkouts using the same list will reference the new branch.

On file create, a new revision is created and the first tag is then defined to point at the main line of the file. Again, checkouts using the same taglist will then reference the new branch.

The last item in the list may have a special form, either a single dash (-) or a single asterisk (*), optionally followed by a number. A dash as the last element specifies that on checkout, if the list does not resolve to any revision (as in all undefined tags), then skip the file without error or warning. This way, files created for and only applicable to a specific branch can be silently ignored by other branches.

An asterisk as the last element in the list specifies that on checkout, if the list does not otherwise select a revision, the default revision is to be accessed, just as if no revision string had been given at all.

Neither dash or asterisk has an effect on checkin, except that it is an error if the list consists only of a dash or asterisk. On file create, if the dash or asterisk is followed (in the same field) by a number, that number will specify the initial revision for the new file, and the first tag will be set accordingly.

Example: usetags /dir BranchTag,BranchPointTag,-2

Lines in .fmrc which do not begin with mapdir, usehost, and usetags are not used by current commands and are ignored.

HMS SERVER CONFIGURATION & LOG FILES

The HMS server uses several files for various purposes. These are described below.

The maptab File

The file /usr/history/maptab describes where HMS should store files on the HMS server machine. It contains lines with two fields separated by tabs or spaces. The first field is an absolute project directory prefix and the second field is the corresponding absolute local directory prefix where the control files are to be stored. For example, if the file contained the lines:

| #logical | physical path on disk |
|---|---|
| /project | /usr/project_srcs |
| /pro/doc | /usr/doc_srcs | then, the logical file /project/goodstuff.c would be stored in the directory /usr/project_srcs, the logical file /pro/doc/ers.tex would be stored in the directory /usr/doc_srcs, and the logical file /pro/doc/phase1/rd.tex would be stored in the /usr/doc_srcs/phase1 directory.

Blank lines and lines beginning with a '#' are ignored, and commenting is encouraged. Note that a longest prefix match is performed in the project table, so a single line serves to map a whole sub-tree of logical path names into the corresponding sub-tree of local directory path names. This greatly simplifies maintenance of the site map table.

Every file managed by HMS should have exactly 1 logical path name. You should not map multiple HMS path names to the same local file or directory.

When creating or updating the maptab file, be sure to create the local directories and set their ownership to hmgr. Otherwise the HMS server may not be able to access these directories:

```
mkdir /usr/project_srcs /usr/doc_srcs
chown hmgr /usr/project_srcs /usr/doc_srcs
chmod 700 /usr/project_srcs /usr/doc_srcs
```

The maptab file can be edited when the HMS server is running. It will notice the change and update its internal data structures automatically.

The inetd.sec File

The file /usr/adm/inetd.sec is used to determine the list of machines which are allowed to access the HMS server. If this file is missing, everyone will be allowed access to HMS (subject to the hms.perm file described below). If the file exists, but is inaccessible to the hmgr user, then all access to HMS is denied. If the inetd.sec file exists and is accessible to the hmgr user, then access is determined by the hmgr service entry according to the standard inetd.sec constructs. See inetd.sec(4) for details.

The inetd.sec file can be edited when the HMS server is running. It will notice the change and update its internal data structures automatically.

The lockinfo File

The file /usr/history/lockinfo is where HMS keeps a current copy of all file lock information. This file will be created and maintained automatically. The HMS server accesses this file for all lock or lock information requests. At startup time, the HMS server creates an in-memory index for efficient access. It should not be edited. If it becomes necessary to edit this file, shut the HMS server down first. NEVER modify lockinfo while the HMS server is running. After lockinfo has been modified, run the fixdb program on lockinfo and copy the good output onto lockinfo before restarting the HMS server. Again, NEVER EDIT LOCKINFO WHEN HMSD IS RUNNING.

If fixdb must be run, run it as:

```
cd /usr/history
fixdb lockinfo outOK outBAD
```

If "bad=0" is printed, then copy outOK onto lockinfo (of course, do this all when the HMS server is not running). If there are bad records, then edit the outBAD file to try to fix the problems and run fixdb on the fixed file. Concatenate all the "OK" files together and recheck before replacing the lockinfo file.

The histlog File

The file /usr/history/histlog is appended to by the HMS daemon, and contains various status and error messages. Look here when unexpected events occur. This file is kept open in append mode by hmsd.

The activityLog File

The file /usr/history/activityLog holds modification records. The HMS server writes a line to this file for every activity which the admin has selected for logging. This file can be moved or truncated or deleted without affecting HMS as it reopens the file for each write.

The hms.perm File

The file /usr/history/hms.perm is used to determine user access rights to HMS files. Please see the sample file for more information.

The hms.options File

The file /usr/history/hms.options is used to specify a few HMS options. These are mostly self-explanatory. The LogOptions flags are the same as the permissions bits and turn on logging for specified operations. The default value logs all modifications. Use 'S' to log every operation.

B. FCI(1)

NAME
    fci - file check in - check in new versions of HMS files
SYNOPSIS
    fci [-kquwRV] [-hhost] [[-p] -mmessage] [-rrev] file
    . . .
    fci [-hhost] [-rrev] -[nN]type [-cstring] file . . .
SHARED SOURCE SYNOPSIS
    fci [-kquwRV] [-hhost] [[-p] -mmessage] -rtag file
    . . .
    fci [-hhost] -rtag -nRCS [-cstring] file . . .
    fci -NRAW file . . .

DESCRIPTION

For each HMS file argument, fci adds a new version to the HMS revision history. fci prompts for a change message to be stored with the new version and reads it from the standard input. Once the new version has been checked in, fci removes it from the local system and deletes the HMS lock on file.

fci is also used to create new HMS revision files. See -n below.

If file refers to a directory, a new version will be created for each locked file in that directory for which a local working copy exists.

| Options | |
|---|---|
| -cstring | Set the RCS comment leader. This option is recognized with the -nRCS option. |
| -hhost | Use the HMS server on host. |
| -l | Check in file, do not delete the file lock, and check out the new version. When combined with the -p option, the new version is written to standard output. Otherwise, the new version is written to the local file and left writable. |
| -mmessage | Use message as the change log. |
| -ntype | Create new HMS files with versioning method of type type. Valid types are BIN, RAW (non-versioned), RCS and SCCS. |
| -Ntype | Install existing RCS and SCCS files into HMS. Valid types are RCS and SCCS. |

-continued

| Options | |
|---|---|
| -p | Read data to check in from standard input. the -m option is required when this option is given. |
| -q | Perform actions quietly. |
| -rrev | Set the versions of the checked in file to rev. Rev can be a revision number or (BIN and RCS types only) a symbolic name. |
| -R | Recursively check in locked files for which a local working copy exists. |
| -u | Check in file, delete the file lock and check out the new version. When combined with the -p option, the new version is written to standard output. Otherwise, the new version is written to the local file and left read-only to prevent accidental modification. |
| -V | Print the HMS version string. |
| -W | Check in file, delete the file lock and check out the new version. When combined with the -p option, the new version is written to standard output. Otherwise, the new version is written to the local file and left writable, although it cannot be checked in without first being locked. Be careful with this option. |

DIAGNOSTICS

Exit status is 0 if all specified files were successfully checked in, 1 if a file could not be checked in, and 2 if there was a bad option or a network error.

EXAMPLES

To check in the working file boolean.h into project/boolean.h, enter the command

```
fci /project/boolean.h
```

To check in the file /project/README and keep an unlocked copy, enter the command

```
fci -u /project/README
```

To check in a formatted manual page as HMS name bar, enter the command

```
nroff -man foo.1 | fci -p -m "nroff output" bar
```

SHARED SOURCE MODIFICATIONS

There are numerous shared source modifications to fci(1):

(1) The -r option, together with a valid symbolic name, is required. The given tag corresponds to the release that this change will first appear in. The user must specify a tag that appears in the shared source symbols file. Talk to the Shared Source Administrator if you do not know which tag to use.

(2) fci(1) will update an hpux_rel.c,v file if it finds one. After all check-ins have completed, fci(1) will automatically create a new revision for each hpux_rel.c,v file that it finds. Please refer to the Commands Handbook for more information on the hpux_rel.c functionality.

(3) The user may be prompted to move symbolic names during a check-in. If you are unsure which tags to move, please contact your shared source administrator. As a general rule, you should obey the default move action that is given on the command line.

(4) If the check-in tag (the tag that is specified on the command line) is fixed at a certain value in the shared source file, fci(1) will automatically move it to the new revision.

(5) If the new revision being created is on a branch, fci(1) will warn the user to merge his change back onto the trunk.

(6) When a new file is created, the user is forced to identify which release the new file will first appear in. This is done through the use of a valid symbolic name.

(7) fci(1) will not permit a user to import or create SCCS files, and will not allow users to import any current RCS or SCCS files into shared source.

SHARED SOURCE EXAMPLES

To check in a new version of ls.c for the 8.0 release:

```
fci -r REL/8_0
/hpux/shared/supp/usr/src/cmd/ls.c
```

To check in a new version of more.c for 9.0, and re-lock the new version:

```
fci -l -r REL/9_0
/hpux/shared/supp/usr/src/cmd/more.c
```

To create a new RCS file in shared source, called main.c, that will be used by the command more, and that will first be used in the 8.0 release:

```
fci -nRCS -r REL/8_0
/hpux/shared/supp/usr/src/cmd/more/main.c
```

C. FCO(1)

NAME fco - file check out - check out HMS files

SYNOPSIS fco [-flnpqvwMRV] [-hhost] [-ddate] [-rrev] name . . .

SHARED SOURCE SYNOPSIS fco [-fpqvwMRV] [-hhost] [-ddate] [[-l]-rrev] name . . .

DESCRIPTION fco will retrieve (check out) any version of an HMS file and optionally lock it against simultaneous edits. If name is an HMS directory, then all the files in the HMS directory are retrieved.

| Options | |
|---|---|
| -ddate | Retrieve the file version as it existed on date. The format YY/MM/DD hh:mm:ss is recognized by fco as well as more standard formats, such as Feb 21, 1987 23:34:00 and 11NOV87 21:34. |
| -f | Enable overwriting of local files which are editable (writable). Normally, only non-editable (readonly) files will be overwritten. |
| -hhost | Use the HMS server on host. |
| -l | Retrieve file for modification and create an HMS lock against simultaneous modifications by others. This option enables later use of fci(1) on the file. |
| -M | Causes local directories to be made as necessary. |
| -n | Print revision information, but do not write any files. Useful for simply |

| Options | |
|---|---|
| | obtaining revision information. |
| -p | Retrieve file contents to standard output. |
| -q | Perform actions quietly. |
| -rrev | Check out the version of the file specified. Rev is a number of the form "R.L", where R is the major release number and L is the level within the release, or rev specifies a branch with a number of the form "R.L.B.L", where B is the branch. If the underlying control system is RCS, then rev can also be a symbolic version name. |
| -R | Recursively check out all files in a directory. Files are written into subdirectories of the local directory as appropriate. |
| -V | Print the HMS version string. |
| -w | Retrieve file for modification, but do not create a lock. |

On interrupt, fco will abort its operation and clean up the transaction in progress. Either the new file will be completely written, or the old file will be left unchanged. This behavior also applies to check out operations performed by the other PIMS commands.

DIAGNOSTICS

Exit status is 0 if all specified files were successfully checked out, 1 if a file could not be checked out, and 2 if there was a bad option or a network error.

EXAMPLES

To check out the latest versions of all the files below/ project in the HMS hierarchy, enter the command

```
fco -MR /project
```

To check out the file/project/README as it existed on Apr. 16, 1988, at 1:30 in the afternoon, enter the command

```
fco -d "April 16,1988 13:30"
/project/README
```

SHARED SOURCE MODIFICATIONS

The only modifications to fco(1) for shared source relate to locking a file. When a file is checked out with a lock, fco(1) insists on the user supplying a valid symbolic name. If no symbolic name is given, or the symbolic name specified is not valid, fco(1) will issue an error and exit.

SHARED SOURCE EXAMPLES

To check out and lock ls.c for an 8.0 modification:

```
fco -l -r REL/8_0
/hpux/shared/supp/usr/src/cmd/ls.c
```

D. FDIFF(1)

NAME fdiff - compare HMS file versions

SYNOPSIS fdiff [-C n] [-bceffHintw] [-hhost] [-V] [ rev1 [ rev2 ] ] file ...

DESCRIPTION fdiff prints the differences between two versions of a file. When no options are specified, fdiff compares the local file with the most recent checked in version on the main line of descent, and writes the differences to standard output. If one version is specified, then that version is compared with the local file. If two versions are specified, then those two versions are compared. The program diff(1) is called to perform the actual comparison.

rev1 and rev2 are specified as either revision names or numbers (preceded by -r), or as dates (preceded by -d).

| Options | |
|---|---|
| -b | Cause trailing blanks (spaces and tabs) to be ignored and other strings of blanks to compare equally. Passed to diff(1). |
| -c | Perform context diff with 3 lines of context. Passed to diff(1). |
| -C n | Perform context diff with n lines of context. Passed to diff(1). |
| -ddate | Use the HMS file version that was current on date. |
| -e, -f | Produce a script of a, c, and d commands for the editor ed(1). Passed to diff(1). See diff(1) for details. |
| -H | Do a fast, half-hearted job. Passed to diff(1) as -h. |
| -hhost | Use the HMS server on host. |
| -i | Ignore upper/lower case differences. Passed to diff(1). |
| -n | Print revision information on the files, but do no check out. Useful for simply comparing revisions. |
| -rrev | Use the HMS file version rev. |
| -t | Expand tabs in output lines. Passed to diff(1). |
| -w | Ignore all white space (blanks and tabs). Passed to diff(1). |
| -V | Print the HMS version string. |

EXAMPLES

The command fdiff /project/file.c compares the latest version of the HMS file /project/file.c and the checked out file file.c.

The command

```
fdiff -d "June 15, 1989" /pws/hi
``` compares the latest version of the HMS file /pws/hi and the checked out file hi.

DIAGNOSTICS

Exit status is 0 for no differences, 1 for some differences and 2 for a bad option or network problem. Error and informational messages will go to stderr, difference output will go to stdout.

E. FHIST(1)

NAME fhist—display the revision history of an HMS file

SYNOPSIS fhist [-ERVmt] [-ddate] [-hhost] [-rrev] names

DESCRIPTION fhist displays the revision history of an HMS file. The output of fhist differs slightly from the output of rlog.

| Options | |
|---|---|
| -ddate | Only print information for versions since date. |
| -E | Only get history about locally existing riles. |
| -hhost | Use the HMS server on host. |
| -m | Merge the change information for all |

| Options | |
|---|---|
| | versions of names into one list. The output is sorted by time of change, first change first. Compare with -t option. |
| -n | Merge the change information for all versions of names into one list. The output is sorted by HMS path name. |
| -rrev | Specify the version of a file to print information for. For SCCS versioned files, rev must be a single value. Information for all versions since and including this version will be printed. For BIN and RCS typed files, rev can be a list of comma-separated versions and ranges. |
| -R | Recursively report on all HMS files found in names. |
| -t | Same as -m, except that the output is sorted in reverse order, most recent changes first. |
| -V | Print the HMS version string. |

F. FLS(1)

NAME fls, fl, fll, flsf, flsr, flsx—list contents of HMS directories

SYNOPSIS

```
fls [ -1dflmprtxFLNRUVX ] [ -h host ] [ -u user ] [ names ]
fl [ fls options ] [ names ]
fll [ fls options ] [ names ]
flsf [ fls options ] [ names ]
flsr [ fls options ] [ names ]
flsx [ fls options ] [ names ]
```

DESCRIPTION

For each HMS directory argument, fls lists the contents of the directory; for each HMS file argument, fls repeats its name and any other information requested. When no argument is given, the current directory is listed. The output will be sorted alphabetically, unless overridden by an option.

There are three major listing formats. The format chosen depends on the option flags. The default format is to list the contents of directories in multi-column format, with the entries sorted down the columns. The -1 (one) option specifies single column format, the -x option specifies multi-column format, with the entries sorted across the page, and the -m option specifies stream output format in which files are listed across the page, separated by commas. In order to determine output formats for the -x and -m options, fls uses an environment variable, COLUMNS, to determine the number of character positions available on one output line. If this variable is not set, the terminfo database is used to determine the number of columns, based on the environment variable TERM. If this information cannot be obtained, 80 columns is assumed.

| Options | |
|---|---|
| There are numerous options: | |
| -1 (one) | The file names will be listed in single column format regardless of the output device. This will force single column format to the user's terminal. |
| -d | If an argument is a directory, list only its name (not its contents); often used with -1 to get the status of a directory. |
| -f | Print information as it is found. Output is unsorted, single column format. This is useful in shell pipelines as it speeds down stream processing. Otherwise all information must be gathered before anything can be printed. |
| -hhost | Use the HMS server on host. |
| -l | List in long format, giving mode, type, locks, size in bytes, and time of last modification for each file. |
| -m | Stream output format. |
| -p | Put a slash (/) after each file name if that file is a directory. |
| -r | Reverse the sort order. This results in reverse alphabetic, or, with the -t option, the oldest first. |
| -t | Sort by time modified (latest first) instead of by name. |
| -uuser | Only list files locked by user. This option implies -L. |
| -x | Multi-column output with entries sorted across rather than down the page. |
| -F | Put a slash (/) after each file name if that file is a directory, put an asterisk (*) after each file name if that file is executable, and put an exclamation point (!) after each file which is locked. If a file is both executable and locked, the exclamation point will appear after the asterisk. |
| -L | List only locked files. If long format is also specified, the time shown will be the lock time rather than the modification time. |
| -N | List mode and time in a numeric format. Mode is listed as an octal number and time as a decimal number. |
| -R | Recursively list subdirectories encountered. |
| -U | Only list files owned by self. This option implies -L. |
| -V | Print the HMS version string. |
| -X | List names in expanded form. | fls normally is known by several names which provide shorthands for the various formats:

fl is equivalent to fls -m.
fll is equivalent to fls -l.
flsf is equivalent to fls -F.
flsr is equivalent to fls -Rf.
flsx is equivalent to fls -x.

The shorthand notations are implemented as links to fls. Option arguments to the shorthand versions behave exactly as if the long form above had been used with the additional arguments.

DIAGNOSTICS

Exit status is 0 if there were no errors, 1 if one or more files do not exist, and 2 if there was a bad option or network problem. Error messages will be printed to stderr, normal output will go to stdout.

EXAMPLES

The following command prints a long listing of all the files in the current HMS directory. The file most recently modified (the youngest) is listed first, then the next youngest file, and so forth, to the oldest.

fls -lt

To list the absolute path of the current default HMS directory, enter fls -dX

To list all the locked files in an HMS directory hierarchy, enter fls -lLR

Here is a shell script fragment to check if an HMS file is locked:

```
if [ "fls -L ${file} 2>/dev/nul" =
    "${file}"]; then
        echo ${file} is locked.
fi
```

WARNINGS fls does not change its output format based on output device. This differs from the HP-UX ls command. Use fls -1 (one) to obtain single column output.

Unprintable characters in file names may confuse the columnar output options.

FILES

| /usr/lib/terminfo/?/* | to get terminal information. |
|---|---|

G. FMERGE(1)

NAME
  fmerge—merge HMS revisions
SYNOPSIS
  fmerge [-hhost] [-p] -rrev1 [-rrev2] file
DESCRIPTION
  fmerge incorporates the changes between two versions of an HMS file into the local file.
  One or two versions can be given. If the second revision is omitted, the latest version on the trunk is assumed. Both rev1 and rev2 may be given numerically, symbolically, or by date.

| Options | |
|---|---|
| -hhost | Use the HMS server on host. |
| -P | Print results to standard output rather than to the working file. |
| -rrev1 | First version. This is required. |
| -rrev2 | Second version. If omitted, the most recent trunk version is assumed. | fmerge prints a warning if there are overlaps, and delimits the overlapping regions as explained for the merge(1) command.

EXAMPLES

Suppose you have released version 1.2 of f.c. Assume furthermore that you have just completed version 1.4, when you receive updates to release 1.2 from someone else. To combine the updates to 1.2 and your changes between 1.2 and 1.4, put the updates to 1.2 into file f.c and execute:

```
fmerge -p -r1.2 -r1.4 f.c > f.merged.c
```

Then examine f.merged.c. Alternatively, if you want to save the updates to 1.2 in the HMS file, check them in as version 1.2.1.1 and do the merge by executing the commands:

```
futil -l -r1.2 f.c
fci -r1.2.1.1 f.c
fco -r1.4 f.c
fmerge -p -r1.2 -r1.2.1.1 f.c >f.merged.c
```

As another example, the following command undoes the changes between version 1.2 and 1.4 in your currently checked out version in f.c:

```
fmerge -r1.4 -r1.2 f.c
```

Note the order of the arguments, and that f.c will be overwritten.

H. FUTIL(1)

NAME
  futil - perform HMS utility functions
SYNOPSIS
  futil [-hhost] [-ERuxf] [-cstring] [-mmode] [-tfile] name ...
  futil [-hhost] -[B1] -rrev file ...
  futil [-hhost] -[Ss] symbol[:[revision]] [-R] file
  ...
  futil [-hhost] -O -rrev file ...
  futil [-hhost] -M new_dir ...
  futil [-hhost] -v old_file new_file
  futil [-hhost] -v file1 [. . .] dest_directory

DESCRIPTION futil is used to perform miscellaneous HMS tasks. It has options to create and delete directories, delete, rename, and change the mode of files, obsolete revisions (RCS type), manipulate symbolic names (BIN and RCS types), set and delete locks on files, and break locks set by others.

| Options | |
|---|---|
| -B | Break a lock on a file. If there are multiple locks, use the -r argument to specify which lock to break. This option can be used to delete your own locks, in which case it behaves exactly like the -u option. When breaking anothers' lock, you will be prompted for explanation text which will be included in a mail notification to the lock owner. |
| -cstring | Set the RCS comment leader to string. The comment leader is printed before every log message line generated by the keyword $Log: futil.1,v $ Revision 1.8 94/05/05 11:03:32 11:03:32 hmgr (History Manager) Author: sk@hpfcsa.sde.hp.com update -c string text during check out (see co(1)). This feature is implemented by RCS. |
| -E | Only perform operation on HMS files for which a local file exists. |
| -f | Force action without prompting. Useful with -x. |
| -hhost | Use the HMS database on host. |
| -l | Create an HMS lock on a version of a file. Specify the version with the -r option. If no version is specified, then the default version is locked. |
| -mmode | Set the mode of an HMS file. Mode can be numeric or symbolic and supports the same syntax as the chmod(1) command. This option will also set the mode of the local file, and cause future check outs to set this mode. Only the execute bits, and the group and other read bits can be modified. |
| -M | Create a new HMS directory. |
| -O | Obsolete revisions in a file. Only supported on RCS file types. The revision range to be obsoleted must be specified in the -r parameter. |
| -rrev | Specify the version or revision range to operate on. |
| -R | Operate recursively upon each argument. |
| -ssymbol [:[version]] | Use to set or clear symbolic symbols in underlying RCS files. To set a symbol, specify symbol:[version]. If version is omitted, symbol will be associated with the latest version on the trunk. If the colon is omitted, then the symbol will be cleared. If the symbol already exists, |
```

| Options | |
|---|---|
| | this command will fail. |
| -Ssymbol [:[version]] | Same as -s, except that it overrides a previous assignment of symbol. |
| -tfile | Replace descriptive text in the HMS control file with text from file. |
| -u | Delete your HMS lock on a file. |
| -v | Move or rename a file. old-file is renamed to new__file. or file1,file2, . . . are moved to the existing dest__directory. |
| -V | Print the HMS version string. |
| -x | Delete name. If name is a directory, it must be empty. If name is a file, it must not be locked. |

I. FUPDATE(1)

NAME fupdate—update local files from HMS database

SYNOPSIS fupdate [-eflnqwEMRSV] [-hhost] [-pproject] [-ddate] [-rrev]names

SHARED SOURCE SYNOPSIS fupdate [-efnqwEMRSV] [-hhost] [-pproject] [-ddate] [[-l]-rrev] names

DESCRIPTION

For each file argument, fupdate compares the age of the local file with the age of the corresponding HMS file and retrieves new copies of local files which are out of date or missing. For each directory argument, fupdate updates the files in that directory. If no file or directory arguments are given, "." is assumed.

| Options | |
|---|---|
| -ddate | Retrieve the file version as it existed on date. The format YY/MM/DD hh:mm:ss is recognized by fco as well as more standard formats, such as Feb 21, 1987 23:34:00 and 11NOV87 21:34. |
| -e | Modify the exit status for the case where all the files were already up-to-date. See DIAGNOSTICS below. |
| -f | Enable overwriting of local files which are editable (writable). Normally, only non-editable (read-only) files will be overwritten. |
| -hhost | Use the HMS server on host. |
| -l | Retrieve file for modification and create an HMS lock against simultaneous modifications by others. This option enables later use of fci(1) on the file. |
| -n | Print the actions which would be taken, but do not execute them. |
| -pproject | Treat project as the default project. |
| -q | Perform actions quietly. |
| -rrev | Check out the version of the file specified. Rev is a number of the form "R.L", where R is the major release number and L is the level within the release, or rev specifies a branch with a number of the form "R.L.B.L", where B is the branch. If the underlying versioning method is BIN or RCS, then rev can also be a symbolic version name. |
| -w | Retrieve file for modification, but do not create a lock. |
| -E | Only update existing files. Missing files will not be created. The creation of directories is controlled by the -M option. |

| Options | |
|---|---|
| -M | Enable creation of missing local directories corresponding to existing HMS directories. |
| -R | Recursively retrieve out of date or missing files or directories. |
| -S | Update a shadow copy of the remote HMS database. This option causes the control files (the SCCS "s." and RCS ",v" files) to be retrieved, rather than their contents. In addition, the modification time of a master control file will be propagated to the updated files. |
| -V | Print the HMS version string. |

The shadow update feature can be used as an on-line backup mechanism, or to provide optimized read access to remote files. fupdate will update shadow files if either the size or the modification date differ from the master files. Because of this, all READ-ONLY accesses, including regular fupdate accesses, should work consistently from the shadow and master databases.

DIAGNOSTICS

Exit status is 0 if all out-of-date files were successfully updated, and 2 if there was a bad option, a network error, or an out-of-date file which could not be updated.

If the -e option is given, then the exit status is 0 if there were no errors and one or more files were updated, 1 if there were no errors and all files were already up-to-date, and 2 if there was a bad option, a network error, or an out-of-date file which could not be updated.

EXAMPLES

To retrieve from the HMS directory/project into the current directory files which are out-of-date or which are missing locally:

fupdate -MR/project

To update all files existing in the local file system rooted at ".":

fupdate -RE

To update locally existing files, plus make missing local directories for which HMS directories exist:

fupdate -REM

SHARED SOURCE MODIFICATIONS

The only modifications to fupdate(1) for shared source relate to locking a file. When a file is checked out with a lock, fupdate(1) will insist that the user supply a valid symbolic name. If no symbolic name is given, or the symbolic name specified is not valid, fupdate(1) will issue an error and exit.

SHARED SOURCE EXAMPLES

To update the locked shared source files for ksh at the 8.0 level:

```
fupdate -R -lr REL/8_0
/hpux/shared/supp/usr/src/cmd/ksh
```

To update your copy of the shared source file for rcs, making directories as needed:

```
fupdate -MR
/hpux/shared/supp/usr/src/cmd/rcs
```

J. HMSDATE(1)

NAME hmsdate—HMS set date utility

SYNOPSIS hmsdate [-hhost] [-s[b]] [-q]

DESCRIPTION hmsdate is a utility for setting the dates across a network of machines using HMS. If no options are given then the time difference between machines is printed.

| | |
|---|---|
| -hhost | Synchronize time with host. If not specified, the default HMS server is used. See hms(1) for more information. |
| -s | Set the date on the local machine to be in sync with the remote machine. |
| -b | Allows the date to be set backwards as well as forward. Must be used with the -s option. |
| -q | Inhibits printing of informational messages. |

ADMINISTRATION

An entry in /etc/services must exist for hmgr to function properly. A typical entry looks like the following.

| | | |
|---|---|---|
| hmgr System | 5050/tcp | # History Management |

In addition, all machines that service date and time requests from remotely executing hmsdate commands must be running the HMS server process, hmsd.

FILES

| |
|---|
| /etc/services |
| Should contain an entry for the hmgr services with TCP service number of 5050. |

3. ZHMS

It is important to note that ZHMS does not alter the underlying history managed file system 102 with which it works. Instead, it works in conjunction with a history managed file system 102 (e.g., as a shell surrounding, or accessory to, a history managed file system 102).

When given access to a history managed file system 102, one of ZHMS' first tasks is to construct 202 (FIG. 2) a shared file system 104. The shared file system 104 comprises a number of files 302–310 (FIG. 3) which are logically separate from the files of the history managed file system 102. The files 302–310 of the shared file system 104 are derived from the file revision archives 312–324 of a history managed file system 102, and represent discrete file versions. A file revision archive 312 is a file comprising various pieces of data which may be used to construct a specific version of a file 302. For an SCCS or RCS file, a file revision archive 312 might contain metadata (general information concerning the contents and/or status of the revision archive) and a number of deltas (file change information). When a history managed file system 102 receives a request for a specific file version 302, some or all of the deltas in the appropriate file revision archive 312 are merged to construct the desired file version 302.

When constructing the shared file system 104, ZHMS does not actually construct the individual file versions 302–310. This is a task performed by the history managed file system 102 (i.e., HMS). Rather, ZHMS 1) initiates requests to the history managed file system 102 for the file versions 302–310 which will be a part of the shared file system 104, and 2) organizes the file versions 302–310 in directory hierarchies 326. Although a computer responsible for managing the shared file system 104 may read from, or write to, the history managed file system 102, the computer administrator of the shared file system 104 will typically employ read-only access to the history managed file system 102. Construction of a shared file system 104 is necessary since one cannot directly read a file version 302 stored in a file revision archive 312. The deltas comprising the file version 302 must first be extracted and merged into a readable form. Viewing a file revision archive would merely allow one to view a file's metadata and deltas, and not any specific file version.

As stated above, the shared file system 104 comprises one or more directory hierarchies 326; that is, each directory may in turn comprise subdirectories 328–330 (i.e., there are trees of directories). Some of the subdirectories 326, 332 will correspond to defined "views" of files 302–310 extracted from the history managed file system 102. The term "view" (used as a noun) refers to a specific file version, and more specifically, to a collection of files which were modified and/or updated within given time and/or event parameters. Thus, files of a common "view" will comprise versions of files which are updated and/or modified with the same periodic frequency, or as a consequence of some event or milestone. For example, views may comprise daily, weekly, known__good, regression, released, frozen and other defined views. The files 302–308 of a directory hierarchy 326 corresponding to a daily view are updated on a daily basis, whereas the files of a directory hierarchy corresponding to a released view are updated every time a design project is released.

A second task of ZHMS is to provide 204 (FIG. 2) a plurality of users 106–114 with read-only access to its shared file system 104 (directories and files). In this manner, users may simultaneously read shared file versions 302–310 without requesting duplicate copies of files from the history managed file system 102. Personal copies of history managed files consume a significant amount of a user's file storage space (i.e., disk storage, hard drive, or the like), and consequently, a significant amount of his or her available workspace. However, as will be described below, ZHMS provides users 106–114 with much more than an ability to simultaneously read files 302–310 from the shared file system 104.

Each user reads a shared file 302 as a file 436 (FIG. 4) of his or her own user file system 106. This file 436 is called a "zymlink" and is defined as an "annotated" symbolic link to a shared file 302. Though users are capable of simultaneously reading a shared file 302, each of their file systems 106 remains logically separate from other user file systems 108–114, logically separate from the shared file system 104, and logically separate from the history managed file system 102.

Zymlinks 436 to files 302 of the shared file system 104 are established by 1) mapping 206 (FIG. 2) directories hierarchies 344 of a user's file system 106 into directory hierarchies 326 of the shared file system 104, 2) creating 208 symbolic links between individual files 436–442 in a user's file system 106 and the files 302–308 of the shared file system 104, and 3) storing information 210, 212 about the shared files 302–308 to which a user 106 is linked in one or more "local" hidden revision information files 450 (denoted in subsequent computer pseudocode sections as ".revinfo/ z__entire__tree" files) stored in specific locations within the directory hierarchies 344, 446, 448 of a user's file system 106. A file that has been established through directory mapping 206, creation 208 of a symbolic link, and annotation 210, 212 is referred to as a "zymlink". Zymlinks 436–442 are established (i.e., programmed) by a user, and are maintained (i.e., owned) as part of a user's file system 106.

In order to map 206 (FIG. 2) a user's directory hierarchy 344 into a directory hierarchy 326 of the shared file system 104, map entries 352 must be recorded in a file which is accessible to ZHMS. In the preferred embodiment, wherein ZHMS works in conjunction with HMS, the map entry 352 can be made in an appropriate ".fmrc" file. An .fmrc file may comprise numerous HMS commands, as described in the preceding overview of HMS. However, a ZHMS map entry 352 may be entered in the .fmrc file such that HMS treats the map entry 352 as a comment, while ZHMS recognizes the map entry 352 as a command. Each map entry 352 may take the following form:

[ws] #<ws>zmapdir<ws>local_dir<ws>remote_dir[ws]

where local_dir is a privately owned directory 344 in a user's file system 106, and remote_dir is a directory 326 in the shared file system 104. The leading and trailing white space, ws, is optional ("ws" is a string composed of space and/or tab characters). The # character causes the entry to be treated as a comment by HMS, but as a possible command for ZHMS. Both local_dir and remote_dir must represent an absolute physical path; that is, no component of these paths may be a symbolic link, and relative paths are not allowed.

For example, the .fmrc entry:

zmapdir /user1/project /shared/proj would map the local directory hierarchy 344:

/user1/project in user's file system 106 (See FIG. 3) into the remote directory hierarchy 326:

/shared/proj/daily of the shared file system 104, where "daily" is the default "view" directory. The user directory user1/project 344 in the above example is defined as the "zmap point".

A .fmrc file may comprise numerous zmap entries 352 corresponding to a user's file system 106. However, the zmap points 344 contained in these entries 352 must be disjoint; that is, no zmap point 346 may be subsumed by another zmap point 344. In the above example, the following additional .fmrc file entry would be illegal:

zmapdir /user1/project/dirx /shared/proj/dirx

Note that the above example will give a user a daily view of files (i.e., the user will see file versions 302–308 that are updated daily). Since ZHMS saves file storage space in a user's file system 106, a user may desire to map various of his or her directories into different "view" directories of the shared file system 104. In this manner, a user may quickly access multiple file views without creating space for complete file versions in his or her user file system 106.

A view other than the default view may be specified using the .frmc entry:

[ws]#<ws>zhmsview<ws>view_name<ws>local_dir
[<ws>local_dir . . .]

where view_name (for example) may be any of daily, weekly, known good, etc.

For example, the ofrmc entries:

zhmsview weekly /user1/project
zmapdir /user1/project /shared/proj causes the view of files under user1's /user1/project directory 344 of user1's file system 106 to be views of weekly updated files 310 stored in "weekly" subdirectories 332, 334 of the shared file system 104.

The ability to access multiple file views 326, 332 without copying numerous whole file versions 302–310 to one's own user file system 106 is a powerful tool. A user may maintain multiple directory trees in his or her user file system 106, each being mapped to a different view 326, 332 of files. The user can then access each directory tree as needed during the course of his or her work. For example, as an experiment, a user debugging a software design problem that occurs while using files in a daily view can temporarily switch to a user directory tree mapped to a "known good" or "released" view to see if the bug occurs within those revisions of files.

Figure 3:
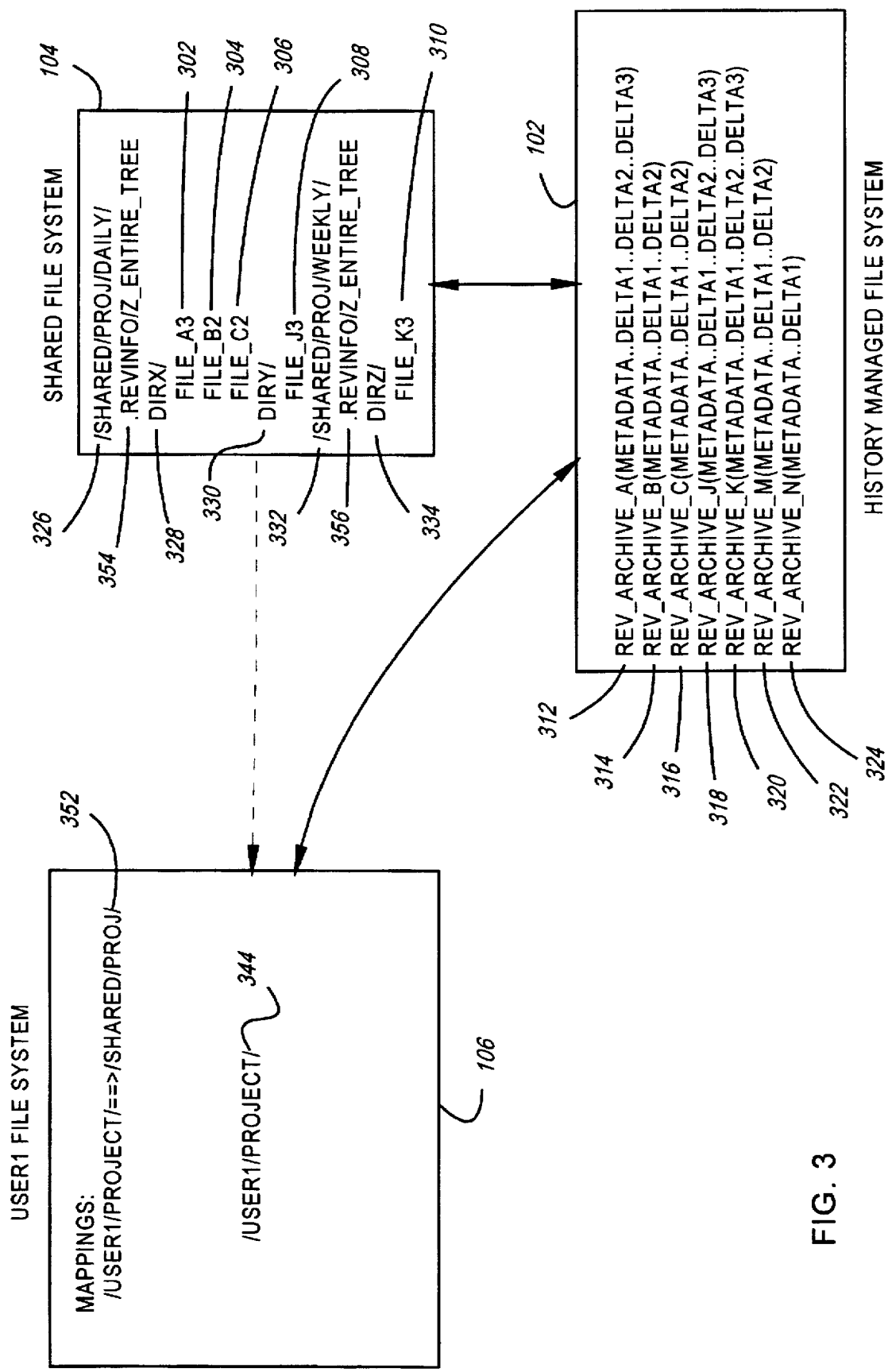
FIG. 3 is a schematic illustrating a newly constructed shared file system.
Figure 4:
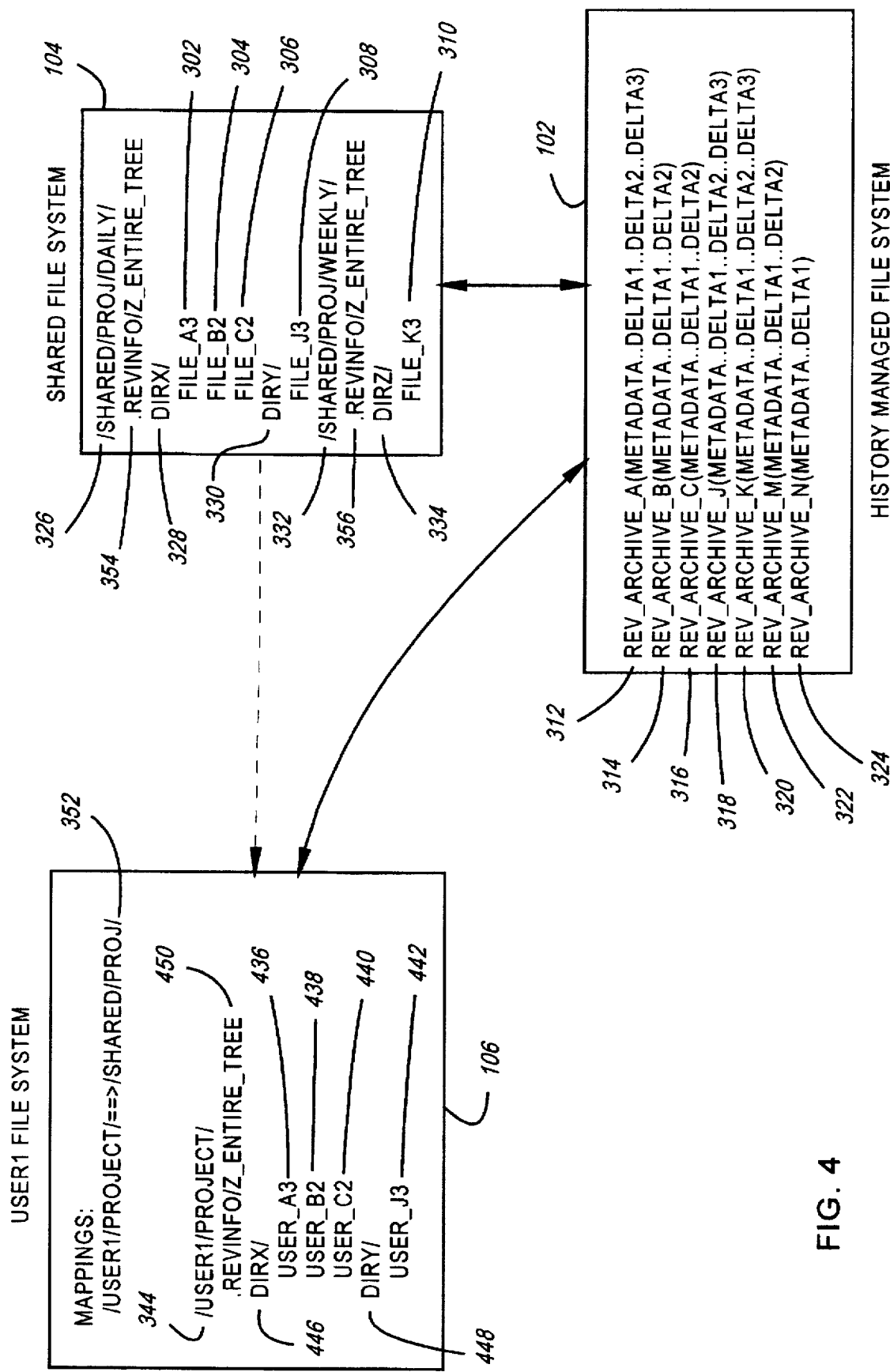
FIG. 4 is a schematic illustrating newly created zymlinks in a user file system.

FIG. 3 shows the state of ZHMS file systems 102, 104, 106 after the creation 202 of the shared file system 104 and the mapping 206 of directory hierarchies 344, 326. FIG. 4 shows the state of ZHMS file systems 102, 104, 106 after zymlinks 436–442 have been established 208, a process which will be described next.

Once a mapping scenario has been defined 206, a user must establish symbolic links between the files 436–442 in his or her user file system 106 and the files 302–308 to which they are mapped in the shared file system 104. (As a point of clarity, note that subdirectories 446, 448 and files 436–442 under a zmap point may or may not exist prior to the creation 208 of zymlinks 436–442. If they do not exist, and are necessary, they will be created as incident to the process of establishing zymlinks 436–442.) Creation of a symbolic link goes hand in hand with annotation of the link, thereby creating a zymlink 436. The symbolic link part of a zymlink 436 is stored as a file 436 under a mapped directory 446 of a user file system 106. The annotations corresponding to symbolic links are stored in a number of hidden revision information files 450 located under zmap points 344. The zco command may be used to create zymlinks 436–442 to the shared file system 104. Its use is summarized as follows:

zco [-Rdfn] [-v view] [name . . . ]

For each file name argument, zco creates 208 a zymlink 436 to the corresponding (i.e., mapped) file 302 in the shared file system 104. Read-only physical files in a user's file system 106 are removed as needed (a physical file is defined herein as a complete copy of a file version, or any other file other than a zymlink; how and why physical files come in to being will be described in more detail later in this description). If a physical file name is writable, or is not found in the shared file system 104, an error message is printed. For each zymlink 436–442 created, a new or updated entry is made in the hidden revision information file 450 associated with the zmap point 344 containing the zymlink 436. "Local" revision information files 450 associated with the zmap point directory hierarchy 344 will be described in greater detail below. For each directory name argument, zco creates directories 446, 448 corresponding to the argument, if necessary, and creates the zymlinks 436–442 under those directories 446, 448.

Preferred options which may be used in conjunction with the zco command are defined as follows. The option -R is used to recursively create all zymlinks under the specified directories, creating subdirectories as needed.

The option -d is used to create zymlinks which link to files (technically file versions) which no longer physically exist as part of the history managed file system 102, and therefore, by default, no longer logically exist as part of the shared file system 104 (however the files must physically exist in the shared file system 104). Logical deletions of shared files may be determined by referring to entries in hidden revision information files 354, 356 stored under the view directories 326, 332 of the shared file system 104. The "remote" hidden revision information files will be described in greater detail below (however, when referring to the following code sections, note that both "local" and "remote" revision information files are stored as ".revinfo/z_entire_tree" files).

The option -f is used to enable conversion of writable physical files in a user's file system 106 to zymlinks. Normally, read-only physical files are the only physical files subject to conversion, and an attempt to convert a writable file generates an error message. Writable physical files typically comprise files which have been obtained from the history managed file system, via a "check out" command such as the HMS fci -1 command, for the purpose of editing the files (i.e., creating a new file version). Preferably, a user is prompted when attempting to use this option since writable files usually represent work in progress, and using the -f option will erase the work in progress.

The -n option merely prints a list of actions to be taken, without executing the actions. This option may be used with other commands to be described below.

The -v view option is used to change the view directory 326 to which a user directory 344, and zymlinks thereunder, are mapped. As earlier stated, a view determines which sub-directory 326, 332 of shared files is linked to by a user file system 106. Use of the -v option not only overrides the default view, but also overrides any view specified in a "zhmsview" entry in an fmrc file. If the -v option is not used, the default view associated with a zco command will be determined by the appropriate zhmsview entries, or if no entry exists, by the default view.

An exemplary use of the zco command in conjunction with the example shown in FIG. 3 is:

```
zco dirx
```

Assuming that no zhmsview entries exist, and the default view is daily, this command establishes zymlinks 436, 438, 440 in a directory "/user1/project/dirx" 446 of user1's file system 106. The zymlinks allow user1 106 to read files 302, 304, 306 in the "/shared/proj/daily/dirx" directory 328 of the shared file system 104. However, if a file, let's say "user_a3" 436, stored in the user directory 446 mapped to the shared directory "dirx" 328 is a writable physical file, it will remain in place and will not be overwritten by a zymlink to the shared file "file_a3" instead, an error message will be issued indicating that the imperative to create a zymlink cannot be honored because a writable physical file already exists.

The zco command performs two main functions: 1) it creates zymlinks 436-442 to files 302-308 in the shared file system 104, and 2) it creates entries in local hidden revision information files 450 associated with the directory tree(s) containing the created zymlinks 436-442. As will be detailed below, the entries in the local hidden revision information files 450 may be used to retain a static view of files (through use of the zreset command). The zco command differs from the zupdate command (to be discussed below) chiefly in that it removes read-only physical files by default and does not concern itself with the modification times of files considered.

The following computer pseudocode illustrates a preferred manner of implementing the zco command (wherein "local" references are to a user file system; "remote" references are to the shared file system; and "zymbolic link" is synonymous with "zymlink"):

```
FOR each command argument Name DO
INITIALIZE num_links_created = 0;
ASSIGN local_file = absolute_path(Name);
CALL local2remote (local_file, remote_file,
    remote_root, local_root);
ASSIGN remote_revinfo_summary_file = remote_root
    + "/.revinfo/z_entire_tree";
ASSIGN local_revinfo_summary_file = local_root
    + "/.revinfo/z_entire_tree";
FOR each file recorded in remote_revinfo_summary_file
    DO
    SET remote_modtimes[file] = modification time
        recorded for file;
    SET remote_revs[file] = revision designation
        recorded for file;
END FOR
FOR each file recorded in local_revinfo_summary_file
    DO
    SET local_modtimes[file] = modification time
        recorded for file;
    SET local_revs[file] = revision designation
        recorded for file;
    SET local_views[file] = view recorded for file;
END FOR
IF remote_file is a regular file THEN
    SET list_of_remotes = remote_file;
ELSE
    IF remote_file is a directory THEN
        IF the Recursive option was given THEN
            SET list_of_remotes to be all non-directories
                in the tree rooted at remote_file,
                excluding remote_revinfo_summary_file;
        ELSE
            SET list_of_remotes to be all non-directories
                contained in remote_file;
        END IF
    END IF
END IF
FOR each remote_file in list_of_remotes DO
    ASSIGN local_file = remote2local(remote_file,
        remote_root, local_root);
    IF remote_file NOT IN remote_revs THEN
        # Ignore this file, which has not been
        registered for ZHMS fetch
        NEXT remote_file;
    END IF
    IF the Force option was not given AND local_file is
        writable AND
        local_file is not a zymlink THEN
        Issue an error message stating that a writable
        file already exists;
        NEXT remote_file;
    END IF
    # Create a zymlink to remote_file.
    Remove local_file;
    Create a symlink linking local_file to remote_file,
    creating local directories as necessary;
    SET local_modtimes[local_file] =
        remote_modtimes[remote_file];
    SET local_revs[local_file] =
        remote_revs[remote_file];
    SET local_views[local_file] = remote_root;
    INCREMENT num_links_created;
    END FOR
    IF (num_links_created > 0) THEN
        Remove local_revinfo_summary_file;
        FOR local_file IN local_revs DO
            Record local_file, local_revs[local_file],
            local_modtimes[local_file], and
            local_views[local_file] in
            local_revinfo_summary_file;
        END FOR
    END IF
END FOR
```

-continued

```
END COMMAND
Note: absolute_path( ), local2remote( ), and
remote2local( ) are the same as # described for zupdate.
```

Although mentioned above, the details or purpose of the local 450 and remote 354, 356 hidden revision information files have not been fully discussed. Remote hidden revision information files 354, 356 are preferably located directly under each view directory 326, 332 of the shared file system 104, and local hidden revision information files 450 are preferably located directly under each zmap point 344 of a user file system 106. Each revision information file 450, 354, 356 contains an entry for each file under its corresponding view directory hierarchy 326, 332 or zmap point directory hierarchy 344. Each entry comprises a file name, a file revision number, and a file modification time (i.e., a date stamp). Although the local revision information files 450 of a user file system 106 are initially derived from one or more remote revision information files 354, 356 of the shared file system 104, the files 450, 354, 356 are separately stored and maintained. Thus, updated revision information, corresponding to a shared file and recorded in a remote revision information file 354, will not appear in a particular local revision information file 450 until a zymlink corresponding to the updated shared file, and stored under the zmap point 344 corresponding to the particular local revision information file 450, is created or updated using either a zco or zupdate command. The zupdate command has yet to be described.

Once a zco command has been issued by a user 106, that user 106 may view shared files to which he or she is mapped and linked. However, he or she has no right to edit a shared file. If a user desires to edit a file, he or she must request a writable copy of the file (a physical file) from the history managed file system 102 (i.e., by using the HMS command fco -1). Requesting a physical file results in a zymbolic link 436 to a corresponding file 302 in the shared file system 104 being destroyed. The zymbolic link 436 is then replaced with the requested physical file. When a user is finished editing a physical file, he or she may check a new file version into the history managed file system 102 (i.e., by using the HMS command fci -u). However, doing so does not alter the state of the shared file system 104, nor does it recreate the destroyed zymbolic link 436. Instead, a read-only copy of the physical file remains in the user's file system 106, in place of the writable physical copy and in place of the destroyed zymlink 436. Note that in a conventional history managed environment, a writable physical file would normally be destroyed by default (leaving nothing in its place) after a user had checked a new file version into the history managed file system 102.

As new file versions are checked into the history managed file system 102, the versions of files 302–310 stored in the shared file system 104 must be updated. Shared files 302–310 are periodically or occasionally updated depending upon the view they represent (i.e., daily, weekly, released). Shared files 302–310 are preferably updated using a command from the following list:

```
zrevfupdate [fupdate_options] [-v view]
    [name . . . ]
zrevfupdate -a [-cn] [-v view] [-h host]
    [-r rev] [directory_name . . . ]
zrevfupdate -P [-n] [-v view]
    [directory_name . . . ]
```

The first usage of zrevfupdate shown in the synopsis above is identical to the HMS fupdate command described in the preceding overview of HMS (ignoring the -v option). This usage causes files 302–310 to be conditionally updated as described in the description of the fupdate command. When using the first usage of zrevfupdate, the shared file system 104 accesses the history managed file system 02 as does a user file system 106. However, for each file 302–310 updated, the revision number retrieved, and modification time of the newly updated file 502 (FIG. 5) are recorded in the proper remote revision information file 354. As earlier stated, these files 354, 356 are located immediately beneath "view" subdirectories 326, 332 of the shared file system 104. The default view associated with the zrevfupdate command is preferably "daily". For each name argument, the absolute physical path to the view subdirectory 326, 332 is found by searching back toward the directory's root, starting from the physical path to the name file or directory, until the view subdirectory 326, 332 is found.

The second usage of zrevfupdate shown in the synopsis above is the same as the first usage, except that the -a option implies the -M and -R fupdate options see the description of the fupdate command in the preceding Overview of HMS, and only the -n, -h, and -r explicit fupdate options are supported (the -n, -h, and -r options are also disclosed in the description of the HMS fupdate command). Also, this usage assumes that any directory_name arguments are indeed directories. If no directory_name argument is given, "." is assumed. The -c option causes an "fclean -dRm" command to be executed for each directory_name argument following the fupdate command issued for each directory_name, provided that the fupdate command completes without error. The fclean command has yet to be described, but will be described in detail below. Note that since the -m option is used with fclean, each directory_name argument is required to be a view subdirectory 326, 332 when the -c option is used.

For example, to update the files 302–306 in the /shared/proj/daily/dirx directory tree 328 of the shared file system 104 shown in FIG. 4, the following command could be issued as part of a daily UNIX cron job:

```
zrevfupdate -a /shared/proj/daily/dirx
```

Figure 5:
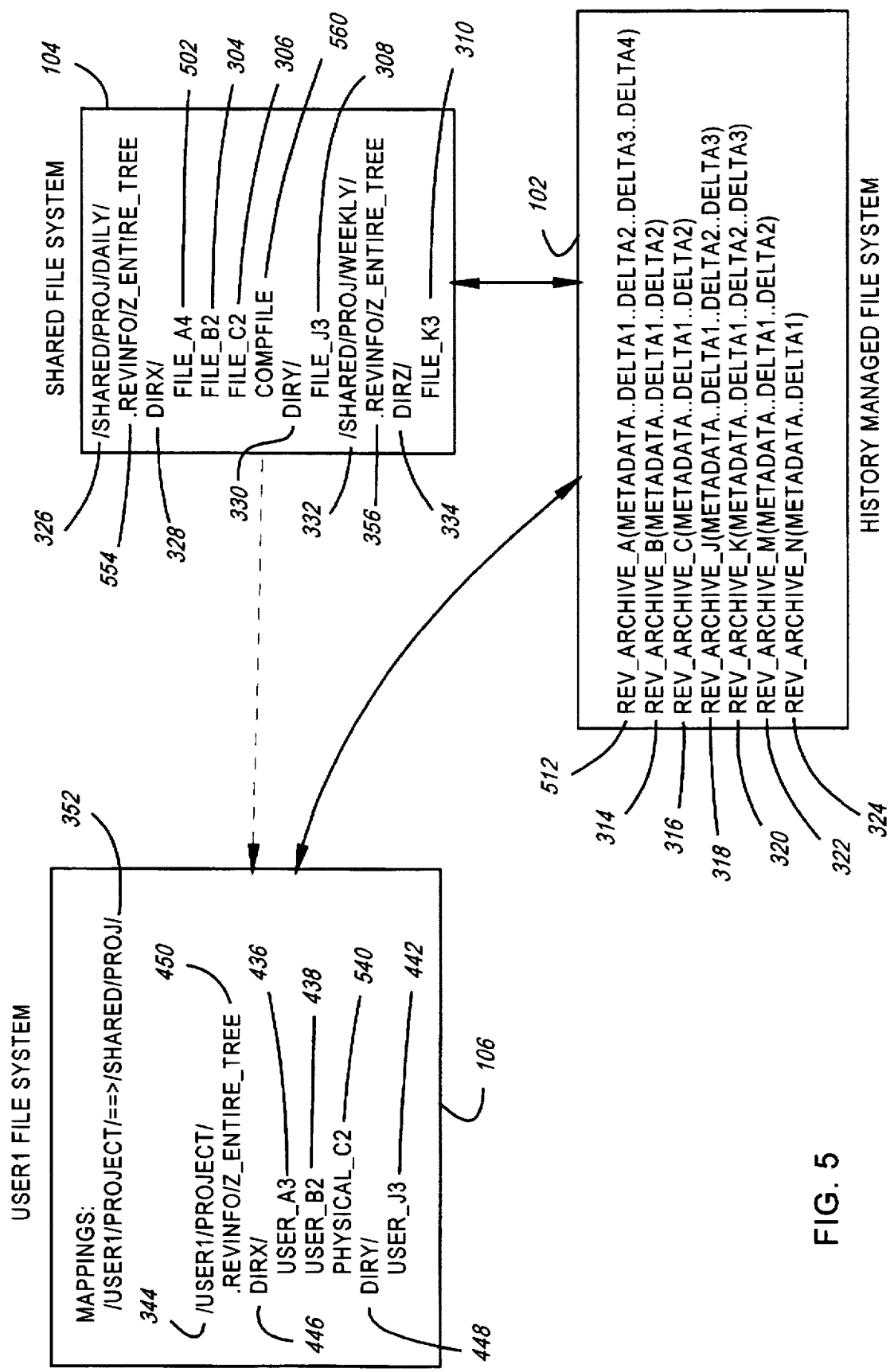
FIG. 5 is a schematic illustrating an update to the shared file system.

The updated files might appear as in FIG. 5. Note that a new file version 502 was checked into the file_a revision archive 512, thus causing file_a3 302 of the shared file system 104 to be replaced with file_a4 502. File revision information concerning file_a4 502 replaces revision information concerning file_a3 302 in the appropriate hidden revision information file 354 (now 554).

Cron jobs, environment variables, and UNIX commands in general, should be familiar to one skilled in the art.

Another example of using zrevfupdate is:

```
zrevfupdate -ac /shared/proj/daily/dirx
```

The above command updates the files 302–306 of the /shared/proj/daily/dirx directory tree while modifying the revision information files 354 (now 554) to indicate the deletion of files from the history managed file system since the previous issuance of the zrevfupdate command. See the following description of fclean. Yet another example of zrevfupdate usage is:

zrevfupdate -MR -vweekly /shared/proj/weekly

This command recursively updates all of the files 310 in the /shared/proj/weekly directory tree 332 (rather than the default "daily" subdirectory 326).

The third usage of zrevfupdate shown in the synopsis above, distinguished by the -P option, is used to "register" in the appropriate remote hidden revision information file 554 all writable files 560 found in the view directory hierarchy 326 containing each directory_name directory 328. That is, for each directory_name argument, the containing view directory tree 326 is searched with a find command for all writable physical files 560. For each file 560 found, an entry is placed in the view directory's hidden revision information file 554; the entry being identical to the entry that would have been created if the file 560 had been retrieved from HMS as type RAW, except that the revision "number" recorded is designated "PRAW" (a RAW file is a non-versioned file for which a history of revisions is not maintained, such as a file which is a compilation of multiple file versions). This allows these files 560 to be linked to by the zco and zupdate commands, even though these RAW files 560 do not exist within the archives 512, 314–324 of the history managed file system 102. This facility is most useful for "registering" object files and executables made after zrevfupdate is run. The -n option has the usual effect actions which would have been taken, but for use of this option, are printed, but not acted upon. (One caveat about the -P option: if "zreset -F" is used on a zymlink that is pointing to a file that has been registered with -P, the zymlink will be silently ignored. In order for these zymlinks to be converted to physical files, the -P option must be given with zreset.)

In short, zrevfupdate is used in place of fupdate to update files 302–310 in the shared file system 104 while keeping information in remote hidden revision information files 354, 356 up-to-date. This allows the updated shared files 502, 304–310 to be linked to using the zco and zupdate commands. It also provides for reliably resetting zymlinks 436–442 to the shared files 302–308 using the zreset command, thus allowing a user to maintain a static view of files.

FIG. 5 illustrates a ZHMS system wherein the shared file system 104 has been updated. However, note also that user1 has retrieved an editable copy of file_c2 306 from the history managed file system 102. This copy is named physical_c2 540, and it replaces the previous zymlink 440 to the read-only file_c2 306. When the user retrieved the physical file 540, the physical file 540 was substituted for its corresponding zymlink 440, thereby destroying the zymlink 440.

The following computer pseudocode illustrates a preferred manner of implementing the zrevfupdate command:

```
FOR each command argument File DO
    OPEN the z_entire_tree file associated with File
    IF the PseudoRaw option was given THEN
        FOR each file contained in the tree rooted at the
            directory File DO
            IF the file is writable THEN
                Record the file name, a revision designation of
                "PRAW", and file modification time in the
                z_entire_tree file.
            END IF
        END FOR
    ELSE
        IF File is a directory THEN
            IF the Recursive option was given THEN
                Request the HMS server to conditionally update
                all out-of-date files contained in the tree
                rooted at File.
            ELSE
                Request the HMS server to conditionally update
                all out-of-date files contained in the directory
                File.
            END IF
        END IF
        IF File is a regular file THEN
            Request the HMS server to conditionally update File
        END IF
        FOR each file update reported by the HMS server DO
            Record the file name, revision number, and file
                modification time in the z_entire_tree file.
        END FOR
    END IF
    CLOSE the z_entire_tree file associated with File
END FOR
END COMMAND
```

The directories 326–334 (FIG. 3) of files 302–310 in the shared file system 104 must be updated frequently so that users 106–114 are accessing the most recent versions 502, 304–310 of files. Preferably, a computer managing the shared filed system 104 would automatically perform periodic updates of the shared files 302–310. In UNIX, periodic issuances of the zrevfupdate command can be performed by cron jobs. However, as earlier stated, some users may wish to retain access to older versions of files (i.e., those that previously existed as part of the shared file system 104). For example, a user 106 who has work in progress may desire that the file versions 302–308 he or she is accessing remain static until his or her work in progress is complete. ZHMS accommodates these users by storing revision information 450 in each user file system 106 at the time zymlinks 436–442 are created 208. Users may use the zreset command to "reset" the logical state of their files so as to mirror the file versions 302–308 which existed in the shared file system 104 at some time prior to a recent zrevfupdate (i.e., prior to the existence of updated shared files 502, 304–308).

In summary, users wishing to access the most recently updated files 502, 304–310 of the shared file system 104 may execute zupdate and/or zco commands in order to update their zymlinks 436–442 to the shared file system 104 and bring locally stored revision information files 450 up-to-date. Users wishing to keep static views of files may issue zreset commands.

It is important that either the zupdate, zco or zreset command be issued by a user subsequent to each update of the shared file system, but before the files 436–442 of a user's file system 106 are accessed. Otherwise, the locally stored revision information files 450 will be out-of-date with respect to the files 502, 304–308 of the shared file system 104, and a user may inadvertently link to a shared file 502 which he or she believes to be a different version 302.

The zupdate and zreset commands will now be described in greater detail.

Usage of the zupdate command is as follows:

zupdate [-EV [-h]] [-FRdfn] [-v view] [name . . . ]

The zupdate command performs three main functions: 1) it creates new zymlinks 642 (FIG. 6) for files 560 that have appeared in the shared file system 104 since the last zrevfupdate, 2) it recreates existing zymlinks 436 whose values are no longer correct, and 3) it updates out-of-date hidden revision information files 450 which might eventually be used by the zreset command.

For each file name argument, zupdate compares the entry for name recorded in the local hidden revision information file 450 (FIG. 5) associated with the tree containing name to the corresponding entry in a corresponding remote revision information file 554. A zymlink 642 to a corresponding file 560 of the shared file system 104 is created for each name that is missing, or is a zymlink whose value is not consistent with the current mapping and view (see -v, below). Entries in the appropriate local revision information files 450 are updated 650 as necessary. For each directory name argument, zupdate creates a user directory corresponding to the argument if necessary, and conditionally updates the zymlinks in that directory. No user directory is created if the corresponding (i.e., mapped) directory of the shared file system is empty of files. If no file or directory name arguments are given, "." is assumed.

The -E option is used to ensure that a user's zymlinks exactly correspond with the files 502, 304-308, 560 of shared file system directories 326, 328, 330. Zymlinks in a user's file system are removed as necessary. For each non-directory name argument that is a zymlink, the name in the user file system 106 is removed if there is no corresponding name in the shared file system 104. For each directory name argument, the zymlinks contained in name are subject to removal. If the -R option is given, the zymlinks in the subtree defined by name are subject to removal. In order to make non-zymbolic links subject to removal, the -h option may be used in conjunction with -E. In order to make physical files subject to removal, the -F option is used to enable the removal of non-writable files, and the -f option is used to enable the removal of all physical files. The -F and -f options are described more fully below. Use of the -E option removes all empty user directories below the zmap point 344 which are not present in the corresponding directory trees 326, 328, 330 of the shared file system 104. Empty directory removal is performed after all zymlinks 436-442 have been updated 636, 438, 640, 642, 442.

The -F option enables replacement of non-writable physical files 540 with a zymlink 640. Normally, only zymlinks 436, 438, 442 are updated—physical files 540 are left intact.

The -R option is used to recursively update out-of-date or missing files and/or directories, creating directories as needed. User directories are created only if a directory of the shared file system 104 contains at least one file.

The -V option is similar to the -E option, but for the fact that zymlinks whose names end in ",v" (e.g., RCS files) are not subject to conditional removal.

The -d, -n and -v view options function as they do with the zco command.

The option -f enables the update 640 of writable physical files 540. Normally, only zymlinks 436, 438, 442 are updated. With the -F option, read-only files are the only physical files 540 which may be updated. The -f option implies the -F option and enables the update of any physical file 540. The -f option must be used with caution, in that work in progress on editable physical files 540 stored in a user's file system 106 will be updated (i.e., replaced with zymlinks 640), thereby erasing work in progress. Preferably, a user is prompted when attempting to use the -f option.

Finally, the -h option, when used in conjunction with the -E option, enables the removal of links other than zymlinks.

In order to update a user's existing zymlinks 436, 438, 442 to all files 502, 304-308, 560 under the daily directory tree 326 of the shared file system's /shared/proj/directory (daily being the default view), the command:

---
zupdate -R /shared/proj
--- is issued. To also replace read-only physical files 540 with zymlinks 640, the command:

---
zupdate -RF /shared/proj
--- is issued. To additionally remove extraneous zymlinks, read-only files, and empty directories, the following command is issued:

---
zupdate -ERF /shared/proj
---

Finally, the command:

---
zupdate -Rf -vreleased
--- may be used to update existing zymlinks, and replace existing physical files with zymlinks, with files linked to "released" shared file system directories.

Figure 6:
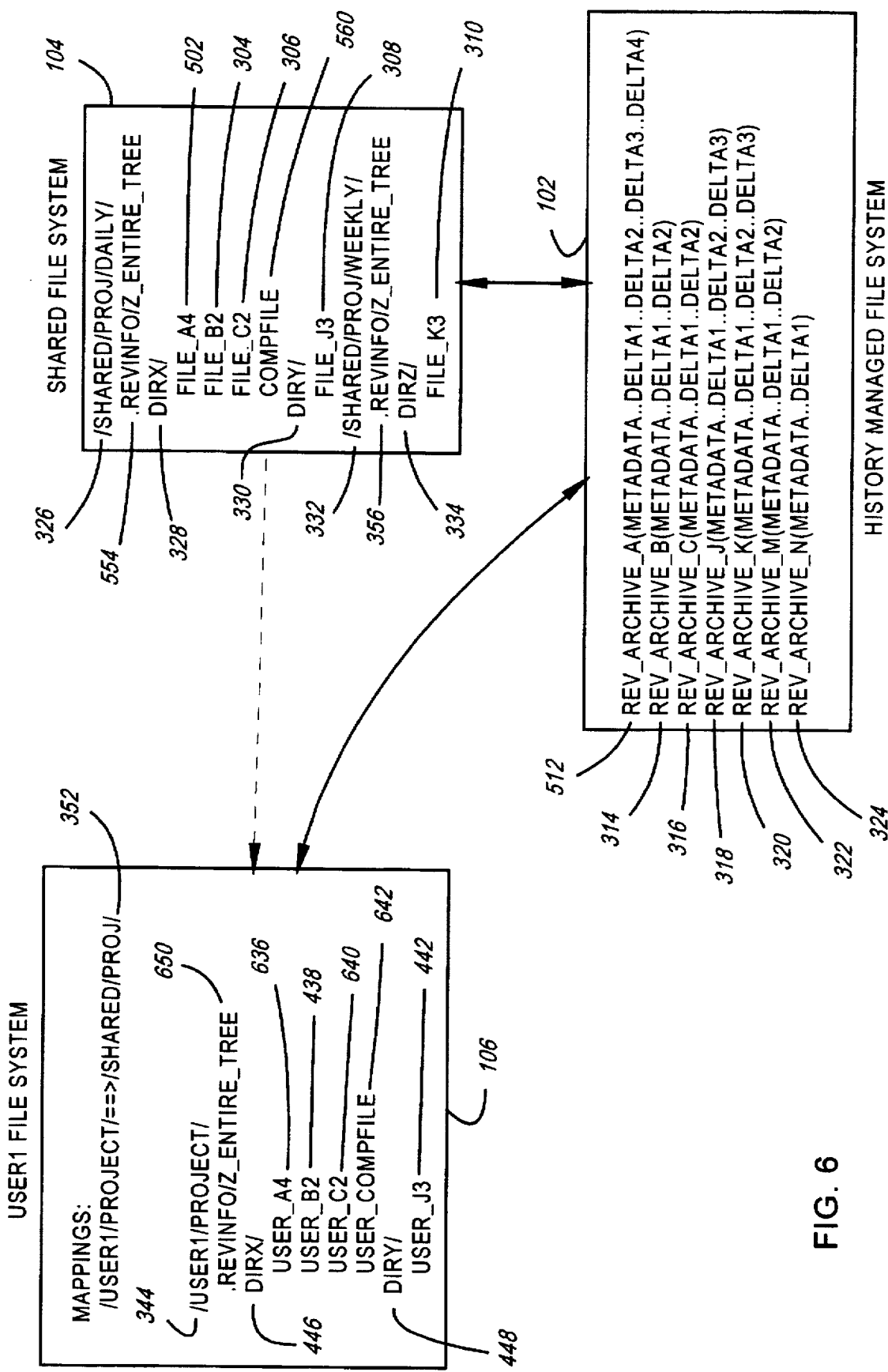
FIG. 6 is a schematic illustrating an update to a user file system.

The state of ZHMS file systems 102, 104, 106 after user1 issues a zupdate -Rf command is shown in FIG. 6.

The following computer pseudocode illustrates a preferred manner of implementing the zupdate command:

```
FOR each command argument Name DO
    INITIALIZE num_links_updated = 0;
    ASSIGN local_file = absolute_path(Name);
    CALL local2remote(local_file, remote_file,
        remote_root, local_root);
    ASSIGN remote_revinfo_summary_file = remote_root
        + "/.revinfo/z_entire_tree";
    ASSIGN local_revinfo_summary_file = local_root
        + "/.revinfo/z_entire_tree";
    FOR each file recorded in remote_revinfo_summary_file
        DO
            SET remote_modtimes[file] = modification time
                recorded for file;
            SET remote_revs[file] = revision designation
                recorded for file;
    END FOR
    FOR each file recorded in local_revinfo_summary_file
        DO
            SET local_modtimes[file] = modification time
                recorded for file;
            SET local_revs[file] = revision designation
                recorded for file;
            SET local_views[file] = view recorded for file;
    END FOR
    IF remote_file is a regular file THEN
        SET list_of_remotes = remote_file;
    ELSE
        IF remote_file is a directory THEN
            IF the Recursive option was given THEN
                SET list_of_remotes to be all non-directories
                    in the tree rooted at remote_file,
                    excluding remote_revinfo_summary_file;
            ELSE
                SET list_of_remotes to be all non-directories
                    contained in remote_file;
            END IF
        END IF
    END IF
    IF local_file is a directory THEN
        IF the Recursive option was given THEN
```

```
            SET list_of_local_files to be all files in the
                tree rooted at local_file, excluding
                local_revinfo_summary_file;
            SET list_of_local_dirs to be all directories in
                the tree rooted at local_file;
        ELSE
            SET list_of_local_files to be all files
                contained in local_file;
            SET list_of_local_dirs = local_file;
        END IF
    ELSE
        SET list_of_local_files = local_file;
        SET list_of_local_dirs = NULL;
    END IF
    FOR each remote_file in list_of_remotes DO
        ASSIGN local_file = remote2local(remote_file,
            remote_root, local_root);
        INITIALIZE file_is_symlink = FALSE;
        INITIALIZE stale_link = FALSE;
        INITIALIZE force_it = FALSE;
        IF local_file exists THEN
            IF local_file is a symbolic link THEN
                ASSIGN file_is_symlink = TRUE;
                IF local_views[local_file] != remote_root
                THEN
                    ASSIGN stale_link = TRUE;
                END IF
            ELSE
                IF the ForceWritables option was given OR
                    the ForceRead-only option was AND
                    local_file in not writable THEN
                    ASSIGN force_it = TRUE;
                END IF
            END IF
        ELSE
            ASSIGN stale_link = TRUE;
        END IF
        IF file_is_symlink OR stale_link OR force_it THEN
            IF remote_file IN remote_revs THEN
                IF the UpdateDeleted option was not given AND
                    remote_revs[remote_file] is prefixed with
                    the string "DELETED_"
                THEN
                    NEXT remote_file;
                ELSE
                    DELETE local_file from
                        list_of_local_files;
                END IF
            ELSE
                # Ignore this file, which has not been
                registered for ZHMS update
                NEXT remote_file;
            END IF
        END IF
        IF stale_link OR force_it OR
            (remote_modtimes[remote_file] >
            local_modtimes[local_file] ) THEN
            IF stale_link OR force_it THEN
                Remove local_file;
                Create a symlink linking local_file to
                    remote_file, creating local directories as
                    necessary;
            END IF
            SET local_modtimes[local_file] =
                remote_modtimes [remote_file];
            SET local_revs[local_file] =
                remote_revs[remote_file];
            SET local_views[local_file] = remote_root;
            INCREMENT num_links_updated;
        END IF
    END FOR
    INITIALIZE num_files_deleted = 0;
    IF the Exact option was given THEN
        FOR local_file IN list_of_local_files DO
            IF local_file is a symlink AND
                (local_file IN local_revs OR
                the AllowSymlinkRemoval option was given)
            THEN
                Remove local_file;
                DELETE local_revs[local_file]
                INCREMENT num_files_deleted;
            ELSE
                IF the ForceWritables option was given OR
                    (the ForceRead-only option was given AND
                    local_file in not writable) THEN
                    Remove local_file;
                    DELETE local_revs[local_file]
                    INCREMENT num_files_deleted;
                END IF
            END IF
        END FOR
        FOR local_dir IN list_of_local_dirs DO
            IF local_dir is empty THEN
                Remove local_dir;
            END IF
        END FOR
    END IF
    IF (num_links_updated > 0) OR (num_files_deleted > 0)
    THEN
        Remove local_revinfo_summary_file;
        FOR local_file IN local_revs DO
            Record local_file, local_revs[local_file],
                local_modtimes[local_file], and
                local_views[local_file] in
                local_revinfo_summary_file;
        END FOR
    END IF
END FOR
END COMNAND
FUNCTION absolute_path(Name)
    RETURN the full path to Name from the root of the file
        system;
END FUNCTION
PROCEDURE local2remote(local_file, VAR remote_file, VAR
        remote_root, VAR local_root)
    FOR each line of the NappingFile DO
        IF line is a "zmapdir local_dir remote_dir" line
        THEN
            SET list_of_remote_paths[local_dir] =
                remote_dir;
        END IF
        IF line is a "zmapview view local_dir . . . " line THEN
            FOR each local_dir DO
                SET list_of_views[local_dir] view;
            END FOR
        END IF
    END FOR
    IF view was specified as a command option
        "ViewArgument" THEN
        ASSIGN view = ViewArgument;
    ELSE
        ASSIGN view = "daily"
    END IF
    FOR local_path IN list_of_views DO
        IF a leading directory path component prefix of
            local_file equals
            local_path THEN
            ASSIGN view = list_of_views[local_path];
        END IF
    END FOR
    FOR local_path IN list_of_remote_paths DO
        IF a leading directory path component prefix of
            local_file equals local_path THEN
            ASSIGN remote_root =
                list_of_remote_paths[local_path] + "/" +
                view;
            ASSIGN remote_file = local_file with remote_root
                substituted for local_path;
            ASSIGN local_root = local_path;
            BREAK FOR;
        END IF
    END FOR
END PROCEDURE
FUNCTION remote2local (remote_file, remote_root,
        local_root)
    RETURN remote_file with local_root substituted for the
        leading path prefix matching remote_root;
END FUNCTION
```

Once a zrevfupdate command is issued by the administrator of the shared file system 104, a user's zymlinks 436 (FIG. 5) may be pointing to newer file versions 502 than those 302 indicated in a user's local hidden revision information files 450. A user 106 should therefore issue zco and/or zupdate commands as frequently as zrevfupdate commands are issued by the administrator of the shared file system 104 to which a user 106 is linked, before investing his or her time making use of the shared file system 104 via his or her zymlinks. If a user 106 regularly issues these commands, he or she has the ability to accurately reset his or her files 436, 438, 540, 442 so as to view file versions 302 which previously comprised the shared file system 104. In fact, if a user has dutifully used either the zco or zupdate command, he or she may then issue zreset commands indefinitely. Also note that if a set of zymlinks falls into disuse by a user, and the user wishes to resume using them, the user has two choices: 1) update the zymlinks using a zco or zupdate command, or 2) reset them using a zreset command. The consequence of using a zreset command is that a user's file system 106 will remain logically static. Zreset will compare the information in a user's local hidden revision information file 450 to the information in a corresponding remote hidden revision information file 554 such that zymlinks 438, 442 to file versions 304, 308 remaining as part of the shared file system 104 will be retained, but zymlinks 436 to file versions 302 which are no longer part of the shared file system 104 will be replaced with physical files 736 retrieved directly from the history managed file system 102. In this manner, a user retains as many zymlinks 438, 442 as possible, thus freeing as much of his or her file storage space as possible.

The preferred format for the zreset command is as follows:

```
zreset [-FPRn] [-c type] [zymlink ... ]
```

For each zymlink argument, zreset compares the corresponding local_rev entry in the local hidden revision information file 450 (FIG. 4) (".revinfo/z_entire_tree") associated with the tree containing zymlink to the corresponding entry in the corresponding remote hidden revision information file 554. If the two revision numbers differ, the last recorded modification time for the file, modtime, is taken from the local revision information file 450, and the following two commands are executed:

```
fco -rlocal_rev zymlink
touch -tmodtime zymlink
```

Where touch is a standard UNIX command, and fco is described in the preceding Overview of HMS. These commands have the effect of "resetting" a zymlink 436 by replacing it with a non-writable physical file 736 that has contents and modification time identical to the file 302 the user was using subsequent to his or her prior most recent issuance of the zco or zupdate command. Note that if zco and/or zupdate commands have not been regularly used, the information in the local revision information file 450 may refer to file versions which existed in the shared file system 104 days or weeks ago, but which in fact were no longer being accessed via the zymlinks. Thus, use of the zreset command would provide a user with erroneous physical files. If the zymlink under consideration points to a "pseudo RAW" ("PRAW") file (i.e., a file that was registered via the -P option to the zrevfupdate or fclean commands), it is ignored. For each directory zymlink argument, zreset conditionally resets each zymlink 436, 438, 442 in the indicated user directories 344, 446, 448. If no zymlink arguments are given, "." is assumed.

The -F option unconditionally resets zymlinks 436, 438, 442; that is, without regard to a comparison of revision numbers.

The -P option is used to convert zymlinks pointing to PRAW files into physical files. This option is identical to -c PRAW.

Again, the -R option recursively resets all zymlinks 436, 438, 442 under the specified directories 344, 446, 448.

Option -c converts zymlinks pointing to files of type type into physical files, where type is either RAW or PRAW. The resultant files have modification time equal to modtime, and permissions set according to the user's current file mode creation mask. This option is a useful work around for the fact that zreset cannot retrieve old revisions from an HMS server for RAW or PRAW zymlinks. ("RAW" files have no revisions, and "PRAW" files are not managed by HMS at all.) Using this option on these zymlinks will convert them to physical files, thereby protecting them from any automated future updates to the shared file system. For example, FIG. 6 shows the PRAW zymlink 642 "user_compfile" in user1's file system 106. If user1 suspects that the file 560 to which this zymlink 642 points might be modified on the shared file system 104, he or she may use the -c option to zreset. This will replace the zymlink 642 with a physical copy of "compfile" 560.

The -n option is used as defined elsewhere in this description.

The main use of the zreset command is to "reset" the logical state of one's directory trees 344, 446, 448 to that which existed before files 302 were updated in the shared file system 104 (i.e., via zrevfupdate). For example, if a user file system comprises a tree "sleet", previously updated with "zupdate -Rv daily sleet" to debug a problem, and wishes to continue his or her work the next day using the same logical set of files, the user must execute "zreset -R sleet". Otherwise, since the shared file system 104 updates this directory hierarchy daily, the user would be working with a new set of files. Zreset works due to the fact that hidden revision information files 450, 354, 356 (FIG. 4) are separately stored, and separately managed, under both shared file directory hierarchies 326, 332 and user directory hierarchies 344 (i.e., under zmap points).

Note that since zreset assumes that the revision information in the local hidden revision information files 450 is up-to-date, zreset, zupdate, or zco should be used at least as often as the shared directory trees 326–330 to which a user is linked are updated, or as often as the user makes use of the links, whichever is least often. For example, a "daily" tree that is being used daily should have a recursive zupdate or zreset run on it every day; a "released" tree should be updated or reset every time a new release is distributed, etc. It is a good idea for a user to execute a zupdate, zco or zreset command before beginning work with a directory tree, especially if the user is not certain whether his or her zymlinks are up-to-date. One common practice is to set up a cron(1m) job that runs zreset as often as is necessary (e.g., daily) to ensure that the logical state of one's trees is static by default. Of course, in order to bring one's trees up-to-date, or to free up disk space, manually executed commands (e.g., fupdate or zupdate) can be run as desired.

Figure 7:
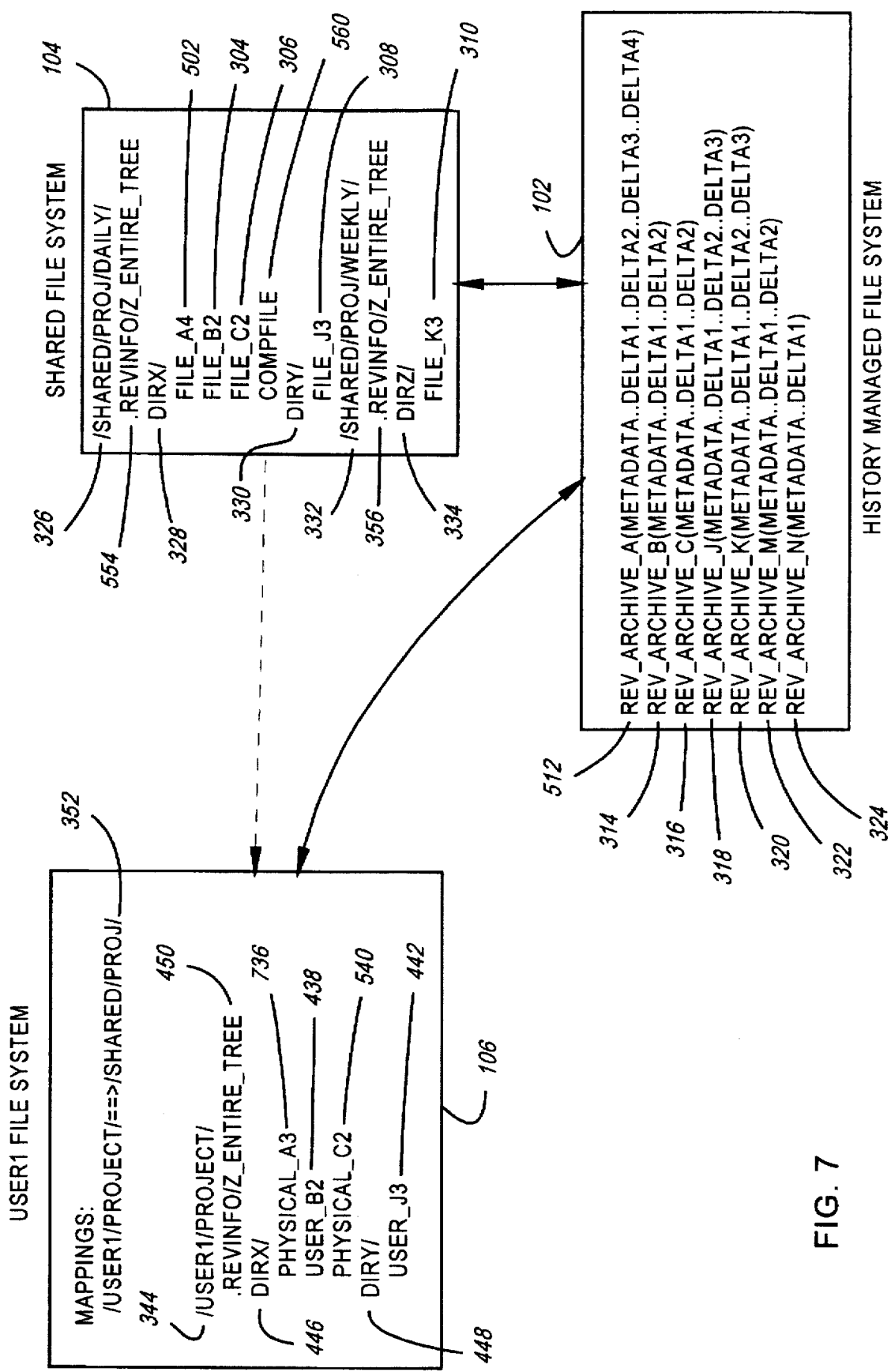
FIG. 7 is a schematic illustrating a reset of a user file system.

The state of ZHMS file systems 102, 104, 106 after user1 issues a zreset command is shown in FIG. 7.

The following computer pseudocode illustrates a preferred manner of implementing the zreset command:

```
FOR each Zymlink command argument DO
    ASSIGN local_file = absolute_path(Zymlink);
    ASSIGN local_root = local2localroot(local_file);
    ASSIGN local_revinfo_summary_file = local_root
        + "/.revinfo/z_entire_tree";
    IF local_root == NULL THEN
        Issue a warning that a zmap point could not be
            determined for Zymlink;
        NEXT Zymlink;
    END IF
    # Build tables of modification times, revision
    designations, and views from
    # local summary file, noticing the number of different
    types of views
    # existing locally:
    FOR each file recorded in local_revinfo_summary_file
        DO
        SET local_modtimes[file] = modification time
            recorded for file;
        SET local_revs[file] = revision designation
            recorded for file;
        SET local_views[file] = view recorded for file;
        Add view recorded for file to set_of_views list;
    END FOR
    # Build table of remote revision designations from
    remote summary file(s):
    FOR each unique remote_root IN set_of_views DO
        ASSIGN remote_revinfo_summary_file =
            remote_root + "/.revinfo/z_entire_tree";
        FOR each file recorded in
            remote_revinfo_summary_file DO
            SET remote_revs[remote_root, local_root + "/" +
                file] = revision designation recorded for
                file, with any "DELETED_" prefix removed;
        END FOR
    END FOR
    IF local_file is a symlink THEN
        SET list_of_local_symlinks = local_file;
    ELSE
        IF local_file is a directory THEN
            IF the Recursive option was given THEN
                SET list_of_local_symlinks to be all symlinks
                    in the tree rooted at local_file;
            ELSE
                SET list_of_local_symlinks to be all symlinks
                    contained in local_file;
            END IF
        ELSE
            # Nothing to do for this Zymlink since it is not
            a symlink or # directory.
            NEXT Zymlink;
        END IF
    END IF
    FOR each local_file in list_of_local_symlinks DO
        IF local_file IN local_revs THEN # local_file is a
            zymlink
            ASSIGN local_revs local_revs [local_file];
            IF (local_views[local_file], local_file) IN
                remote_revs THEN
                remote_rev =
                    remote_revs[local_views[local_file],
                    local_file]
            ELSE
                Issue a warning that local_file is a zymbolic
                    link but no remote revision information could
                    be found;
                NEXT local_file
            END IF
            IF local_rev == "RAW" THEN
                IF remote_rev != "RAW" THEN
                    Issue warning;
                    NEXT local_file;
                END IF
                IF the ForceRaw option was given THEN
                    convert_to_physical_file(local_file);
                    NEXT local_file;
                END IF
            ELSE # local_file is not "RAW"
                IF remote_rev == "RAW" THEN
                    Issue warning;
                    NEXT local_file;
                END IF
            END IF
            IF local_rev == "PRAW" THEN
                IF the ForcePseudoRaw option was given THEN
                    convert_to_physical_file(local_file);
                END IF
                NEXT local_file;
            END IF
                IF the Force option was given OR remote_rev !=
                    local_rev THEN
                    Remove the local_file symlink;
                    Retrieve a read-only copy of revision
                        "local_rev" of local_file from the HMS
                        server;
                    Adjust the modification time of local_file to
                        local_modtimes[local_file];
                END IF
        END IF
    END FOR
END COMMAND
FUNCTION absolute_path (Name)
    RETURN the full path to Name from the root of the file
        system;
END FUNCTION
FUNCTION local2localroot (local_file)
    FOR each line of the MappingFile DO
        IF line is a "zmapdir local_dir remote_dir" line
            THEN
            Add local_dir to list_of_mapped_local_roots;
        END IF
    END FOR
    FOR local_path IN list_of_mapped_local_roots DO
        IF a leading directory path component prefix of
            local_file equals local_path THEN
            RETURN local_path;
        END IF
    END FOR
    RETURN NULL;
END FUNCTION
PROCEDURE convert_to_physical_file(local_file)
    Copy local_file to a temporary file with an unused
        name;
    Adjust the modification time of the temporary file to
        local_modtimes[local_file];
    Rename the temporary file as local_file;
END PROCEDURE
```

A final command to be discussed is fclean. Preferred formats of an fclean command are as follows:

```
fclean [[-Eivx] -g grep_expression] [-FRefhmn]
    [name . . . ]
fclean -d [[-Eivx] -g grep_expression] [-Remn]
    [name . . . ]
fclean -P [[-Eivx] -g grep_expression] [-Remn]
    [name . . . ]
```

Fclean removes all non-writable zymlinks and empty directories given as name which are not currently managed by the history managed file system 102. If name is omitted, "." is assumed. If name is a directory, all zymlinks and directories immediately under name are considered. If the -R option is given, all links and directories under the entire name tree are considered.

If the -h option is given, symbolic links which are non-writable and non-zymlinks are also considered for removal. If the -F option is given, all read-only physical files are also considered for removal. If the -f option is given, all physical files are considered for removal, along with all zymlinks. The -f option implies the -F option, and also implies the -h option when the file pointed to by a symbolic link is writable.

The -g option allows a user to filter the list of file names considered by fclean. It specifies a regular expression to be used as the -e option argument to a grep command. Useful grep options may be specified via the -E, -i, -v and -x options. Up to two -g expressions and attendant options may be given. This filters the list of file names with a pipeline consisting of two grep commands. The order of the grep commands in the pipeline is identical to the order that the -g arguments are specified in an fclean command line. For example, the command:

```
fclean -g '.*\.o$' -E -v -g '.*/(tmp|exp)/.*' -R
``` causes the following filter t be used:

```
grep -e ".*\.o$" grep -E -v -e ".*/(tmp|exp)/.*"
```

This has the effect of considering only those local file names beneath the current directory tree that end in ".o" but do not contain a path name component containing "tmp" or "exp".

The -d option prevents anything from being removed if the candidate for removal is a directory, or has an entry in a local hidden revision information file 450. Under these conditions, the -f and -F options are obviated. Instead of removing the file, its revision number entry in a local hidden revision information file has the string "DELETED_" prepended to it. This allows the zupdate and zco commands to ignore these entries. If -d is given, and the candidate for removal is not a directory and has no entry in a local hidden revision information file, the option has no effect. If -d is given, and name is not subsumed by a map entry in ".frmc" file(s), a warning is given and name is skipped. The -d option is intended for use only by the administrator of the shared file system 104, and in conjunction with the zrevfupdate command.

Another option which is intended for use by the shared file system 104 administrator is -P. This option causes all non-directories implied by name and the -R option, which are not currently under control of the history managed file system 102, to be registered in the appropriate local hidden revision information file 450 with the designation "PRAW". This allows these files to be linked to by the zco and zupdate commands even though they do not exist as part of the history managed file system 102. The -P option of the fclean command is very similar to the same option of the zrevfupdate command. The main difference is that the administrator of the shared file system 104 is given greater control over the set of files registered, especially when used with the -g option.

The -m option is also intended for use only by the administrator of the shared file system 104. The option causes fclean to assume that a hidden revision information file is directly beneath the directory named by name. In the absence of the -m option, the location of a hidden revision information file is deduced from map entries in ".fmrc" file(s).

The following computer pseudocode illustrates a preferred manner of implementing the fclean command:

```
FOR each command argument Name DO
    ASSIGN local_file = absolute_path(Name);
    INITIALIZE Name_is_mapped_for_ZHMS = FALSE;
    IF the MapToName option was given THEN
        ASSIGN local_revinfo_summary_file = Name
            + "/.revinfo/z_entire_tree";
        ASSIGN Name_is_mapped_for_ZHMS = TRUE;
    ELSE
        ASSIGN local_root = local2localroot(local_file);
        IF local_root != NULL THEN
            ASSIGN local_revinfo_summary_file =
                local_root + "/.revinfo/z_entire_tree";
            ASSIGN Name_is_mapped_for_ZHMS = TRUE;
        END IF
    END IF
    IF Name_is_mapped_for_ZHMS THEN
        FOR each file recorded in
                local_revinfo_summary_file DO
            SET local_modtimes[file] = modification time
                recorded for file;
            SET local_revs[file] = revision designation
                recorded for file;
            SET local_views[file] = view recorded for file;
        END FOR
    ELSE
        SET local_revs = NULL;
    END IF
    # Build initial list of files to be considered for
    removal.
    IF local_file is a directory THEN
        IF the Recursive option was given THEN
            SET list_of_local_files to be all files,
                symlinks, and directories in the tree rooted
                at local_file, listed in depth-first order;
        ELSE
            SET list_of_local_files to be all files,
                symlinks, and directories contained in
                local_file, plus local_file, listed in
                depth-first order;
        END IF
```

-continued

```
ELSE
    SET list_of_local_files = local_file;
END IF
Modify list_of_local_files according to any regular
expressions that were
specified.
IF RegularExpression1 was specified on the command
    line THEN
    Remove entries from list_of_local_files according
    to RegularExpression1;
END IF
IF RegularExpression2 was specified on the command
    line THEN
    Remove entries from list_of_local_files according
    to RegularExpression2;
END IF
IF Name_is_mapped_for_ZHMS THEN
    Remove local_revinfo_summary_file from
    list_of_local_files;
END IF
FOR each local_file in list_of_local_files DO
    IF local_file does not exist on the HMS server THEN
        IF local_file is a directory AND
            IF the MarkAsDeleted option was not given AND
                the directory local_file is empty THEN
                Remove directory local_file;
            END IF
        ELSE # local_file is not a directory
            IF the MarkAsDeleted option was given AND
                local_file IN local_revs THEN
                IF local_revs[local_file] is not prefixed
                    with "DELETED_" THEN
                    SET local_revs[local_file] = "DELETED_"
                        + local_revs[local_file];
            END IF
        NEXT local_file;
    END IF
    IF the RegisterAsPseudoRaw option was given
        THEN
        # Register the file as PRAW
        SET local_revs[local_file] = "PRAW";
        SET local_modtimes[local_file] =
            modification time of local_file;
        SET local_views[local_file] = NULL;
        NEXT local_file;
    END IF
    IF local_file is writable THEN
        IF the ForceWritables option was given
            THEN
            Remove local_file from the file system;
            Delete local_file from local_revs,
            local_modtimes, and local_views;
        END IF
    ELSE # local_file is not writable
        IF local_file is a symbolic link THEN
            IF local_file IN local_revs THEN #
                local_file is a zymlink
                Remove local_file from the file
                system;
                Delete local_file from local_revs,
                local_modtimes, and local_views;
            ELSE
                IF the ForceSymlinks option was
                    given THEN
                    Remove local_file from the file
                    system;
                END IF
            END IF
        ELSE # local_file is read-only
            IF the ForceWritables option was given
                OR
                the ForceRead-only option was given
                THEN
                Remove local_file from the file
                system;
                Delete local_file from local_revs,
                local_modtimes, and local_views;
            END IF
        END IF
    END IF
```

```
            END IF
            IF one or more local_files were removed OR
                Name_is_mapped_for_ZHMS AND the information in
                local_revs, local_modtimes, and local_views
                changed THEN
                Remove local_revinfo_summary_file;
                FOR local_file IN local_revs DO
                    Record local_file, local_revs[local_file],
                        local_modtimes[local_file], and
                        local_views[local_file] in
                        local_revinfo_summary_file;
                END FOR
            END IF
        END FOR
    END FOR
END CONMAND
FUNCTION absolute_path (Name)
    RETURN the full path to Name from the root of the file
        system;
END FUNCTION
FUNCTION local2localroot (local_file)
    FOR each line of the MappingFile DO
        IF line is a "zmapdir local_dir remote_dir" line
            THEN
            Add local_dir to list_of_mapped_local_roots;
        END IF
    END FOR
    FOR local_path IN list_of_mapped_local_roots DO
        IF a leading directory path component prefix of
            local_file equals local_path THEN
            RETURN local_path;
        END IF
    END FOR
    RETURN NULL;
END FUNCTION
```

ZHMS allows a user to create zymbolic links to files in a shared file system. A single link is created for each file. A local zymlink to the shared file system may be updated via the zupdate command. Rather than selectively fupdateing individual files, a user simply zupdate's whole trees of files. When it comes time to edit files, a user makes use of the standard fco and fci HMS commands. A user wishing to maintain static files may use the zreset command, provided he or she has properly used either zco or zupdate up to the point where he or she wishes to remain static.

It is presently preferred that the above system be constructed as a network of servers and clients. In a network environment, the history managed files are managed by a first server. The shared file system, and all of the user file systems, access the history managed file system through computers which are set up as clients of the first server. The shared files are managed (or administered) by a second server, and may be "mounted" (i.e., accessed and read) by any of the other clients of the first server. It is possible that a single computer would manage more than one set of system files, however, each set of system files would still be maintained as a separate logical entity.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A computer implemented method for allowing a user to access a plurality of files stored in one or more computer accessible storage medias, and more specifically, a method for allowing a user to access specific versions of the plurality of files, the method comprising:

a) constructing a plurality of file versions to be stored within a shared file system, said file versions being constructed from a plurality of file revision archives stored in a history managed file system, said shared and history managed file systems being logically separate from one another;

b) providing a plurality of user file systems with read-only access to the shared file system, said plurality of user file systems being logically separate from both the shared file system, the history managed file system, and each other, and said plurality of user file systems already having read/write access to the history managed file system;

c) mapping directory hierarchies of the plurality of user file systems into directory hierarchies of the shared file system;

d) creating a plurality of files under the directory hierarchies of a user file system wherein each of the created files is a symbolic link corresponding to a file version comprising the shared file system, said correspondence of symbolic links and file versions being based on the mappings of directory hierarchies;

e) creating first revision information files, said first revision information files being derived from said file revision archives, each first revision information file comprising file revision information corresponding to the file versions of one or more directories of the shared file system's directory hierarchies; and f) creating second revision information files, said second revision information files being initially derived from said first revision information files, each second revision information file comprising file revision information corresponding to the symbolic links of one or more of a user file system's directory hierarchies.

2. A method as in claim 1, further comprising the steps of:

a) destroying a symbolic link when one of the plurality of user file systems requires a writable copy of a file; and b) replacing said destroyed symbolic link with a proprietary copy of a file obtained from one of the plurality of file revision archives, said writable copy of the file possibly comprising a file version which differs from the file version with which the destroyed symbolic link corresponded.

3. A method as in claim 2, further comprising the step of updating the plurality of file versions and first revision information files of the shared file system.

4. A method as in claim 3, wherein the step of updating the shared file system comprises issuing a zrevfupdate command.

5. A method as in claim 3, further comprising the step of updating the symbolic links of a user file system.

6. A method as in claim 5, wherein the step of updating the symbolic links in a user file system comprises:
   a) replacing, if possible, a proprietary copy of a file in the user file system with a new symbolic link to a version of the proprietary file comprising the second file system; and
   b) updating file revision information in second revision information files corresponding to the updated symbolic links.

7. A method as in claim 6, wherein the step of updating the symbolic links of a user file system comprises issuing a zupdate command.

8. A method as in claim 3, further comprising the step of resetting the symbolic links of a user file system in order to circumvent an update to the shared file system.

9. A method as in claim 8, wherein the step of resetting the symbolic links of a user file system comprises:
   a) acknowledging, from the standpoint of a user file system, that the shared file system has been updated; and
   b) obtaining for the user file system, a read-only proprietary version of a file version which no longer exists as part of the shared file system.

10. A method as in claim 9, wherein the step of resetting the symbolic links of a user file system comprises issuing a zreset command.

11. A system stored in one or more computer readable storage medias for allowing a user to access a plurality of files, and more particularly, specific versions of the plurality of files, the system comprising:
   a) a shared file system, and a plurality of user file systems, all of said file systems being physically stored within the one or more computer readable storage medias as logically separate file systems,
      i) said shared file system employing read-only access to a number of file revision archives stored in a history managed file system which is logically separate from said shared and plurality of user file systems, said shared file system comprising,
         A) a plurality of file versions, organized in directory hierarchies and derived from said file revision archives; and
         B) first revision information files, also derived from said file revision archives, each first revision information file comprising file revision information corresponding to the file versions of one or more directories of the shared file system's directory hierarchies;
      ii) said plurality of user file systems having read-only access to said plurality of file versions, and read/write access to said file revision archives;
   b) a number of map entries, the number of map entries indicating which directory hierarchies comprising any of said plurality of user file systems correspond with the directory hierarchies of the shared file system;
   c) a plurality of symbolic links stored as files in the directory hierarchies comprising any of the plurality of user file systems, each of said symbolic links corresponding to a file version comprising the shared file system, said correspondence of symbolic links and file versions being based on the number of map entries; and
   d) second revision information files, initially derived from said first revision information files, each second revision information file comprising file revision information corresponding to the symbolic links of one or more of a user file system's directory hierarchies.

12. A system as in claim 11, further comprising:
   a) means for each of the plurality of user file systems to simultaneous read, via its symbolic links, the file versions comprising said second file system; and
   b) means for each of the plurality of user file systems to obtain its own proprietary version of a file from said file revision archives.

13. A system as in claim 12, wherein the means for each of the plurality of user file systems to obtain its own proprietary version of a file from said file revision archives comprises means to destroy a symbolic link and replace it with a proprietary file version which may or may not be identical to the file version which was previously accessible via the symbolic link.

14. A system as in claim 13, further comprising:
   a) means to update the plurality of file versions and first revision information files of the shared file system, said means being responsive to updates checked into the file revision archives;
   b) means to update the symbolic links between a user file system and the shared file system, said means being independent of said means for updating the shared file system; and
   c) means to reset the symbolic links of a user file system in order to circumvent an update to the shared file system.

15. A system as in claim 14, wherein said means for updating the shared file system comprises a zrevfupdate command.

16. A system as in claim 14, wherein said means for updating symbolic links comprises:
   a) means to replace, if possible, a proprietary version of a file with a new symbolic link to a version of the proprietary file comprising the second file system; and
   b) means to update file revision information in a second revision information file corresponding to an updated symbolic link.

17. A system as in claim 16, wherein said means for updating symbolic links comprises a zupdate command.

18. A system as in claim 14, wherein said means for resetting symbolic links comprises:
   a) means for a user file system to acknowledge an update to the shared file system; and
   b) means for a user file system to obtain a read-only proprietary version of a file version which no longer exists as part of the shared file system.

19. A system as in claim 18, wherein said means for resetting symbolic links comprises a zreset command.

20. A system as in claim 11, wherein:
   a) said file systems exist as a network of servers and clients;
   b) said shared and plurality of user file systems exist as clients of a first server servicing the file revision archives of a history managed file system;
   c) said shared file system exists as a second server; and
   d) said plurality of user file systems exist as clients of said second server.

* * * * *